US012322336B2

(12) United States Patent
Gao et al.

(10) Patent No.: US 12,322,336 B2
(45) Date of Patent: Jun. 3, 2025

(54) PIXEL DRIVING CIRCUIT AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Wenhui Gao, Beijing (CN); Dan Cao, Beijing (CN); Yonglin Guo, Beijing (CN); Jingwen Zhang, Beijing (CN); Zhiliang Jiang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/293,172

(22) PCT Filed: Jan. 19, 2023

(86) PCT No.: PCT/CN2023/073090
§ 371 (c)(1),
(2) Date: Jan. 29, 2024

(87) PCT Pub. No.: WO2024/152289
PCT Pub. Date: Jul. 25, 2024

(65) Prior Publication Data

US 2025/0078748 A1 Mar. 6, 2025

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0426* (2013.01);
(Continued)

(58) Field of Classification Search
CPC .................. G09G 3/3233; G09G 3/32; G09G 2300/0426; G09G 2300/0819;
(Continued)

(56) References Cited

U.S. PATENT DOCUMENTS

| | | | | |
|---|---|---|---|---|
| 11,049,458 | B1 * | 6/2021 | Fan | G09G 3/3266 |
| 11,620,950 | B2 * | 4/2023 | Yang | G09G 3/3258 345/55 |

(Continued)

FOREIGN PATENT DOCUMENTS

| | | |
|---|---|---|
| CN | 1667681 A | 9/2005 |
| CN | 105679237 A | 6/2016 |

(Continued)

OTHER PUBLICATIONS

International Search Report & Written Opinion mailed Oct. 13, 2023, regarding PCT/CN2023/073090.

*Primary Examiner* — Ibrahim A Khan
(74) *Attorney, Agent, or Firm* — Intellectual Valley Law, P.C.

(57) ABSTRACT

A pixel driving circuit is provided. The pixel driving circuit includes a driving transistor; a storage capacitor having a first capacitor electrode and a second capacitor electrode; a coupling capacitor having a third capacitor electrode and a fourth capacitor electrode; a control transistor; and a data write transistor having a gate electrode connected to a gate line, a first electrode connected to a data line, and a second electrode connected to a first electrode of the control transistor; wherein the control transistor has a gate electrode connected to a fourth control signal line, a first electrode connected to the second electrode of the data write transistor, and a second electrode connected to the first capacitor electrode and the fourth capacitor electrode; a gate electrode
(Continued)

of the driving transistor is connected to the third capacitor electrode; and the control transistor is an n-type transistor.

16 Claims, 14 Drawing Sheets

(52) U.S. Cl.
CPC ............... *G09G 2300/0819* (2013.01); *G09G 2300/0852* (2013.01); *G09G 2310/0248* (2013.01); *G09G 2310/061* (2013.01); *G09G 2320/045* (2013.01)

(58) Field of Classification Search
CPC ... G09G 2300/0852; G09G 2310/0248; G09G 2310/061; G09G 2320/045
See application file for complete search history.

(56) References Cited

U.S. PATENT DOCUMENTS

| | | | | |
|---|---|---|---|---|
| 11,749,196 | B1 * | 9/2023 | Kim | G09G 3/32 345/211 |
| 2005/0200618 | A1 | 9/2005 | Kim et al. | |
| 2011/0157126 | A1 * | 6/2011 | Chung | G09G 3/3233 345/76 |
| 2013/0241562 | A1 * | 9/2013 | Jin | G09G 3/006 445/2 |
| 2016/0155387 | A1 | 6/2016 | Kim et al. | |
| 2017/0162118 | A1 | 6/2017 | Liu et al. | |
| 2018/0247591 | A1 * | 8/2018 | Kim | G09G 3/3233 |
| 2020/0258966 | A1 * | 8/2020 | Cha | H10D 86/60 |
| 2021/0142735 | A1 * | 5/2021 | Cho | G09G 3/3233 |
| 2021/0150989 | A1 * | 5/2021 | Shi | G09G 3/3225 |
| 2021/0193036 | A1 * | 6/2021 | Huang | G09G 3/3233 |
| 2021/0201759 | A1 * | 7/2021 | Cho | G09G 3/3233 |
| 2021/0312866 | A1 | 10/2021 | Fan et al. | |
| 2022/0310017 | A1 * | 9/2022 | Yang | G09G 3/3241 |
| 2023/0105490 | A1 | 4/2023 | Park et al. | |
| 2023/0112488 | A1 * | 4/2023 | Yang | G09G 3/3266 345/204 |
| 2023/0360600 | A1 * | 11/2023 | Wang | G09G 3/3233 |
| 2024/0013705 | A1 | 1/2024 | Wang et al. | |

FOREIGN PATENT DOCUMENTS

| | | | | |
|---|---|---|---|---|
| CN | 105679242 | A | 6/2016 | |
| CN | 110264946 | A | 9/2019 | |
| CN | 112951154 | A | 6/2021 | |
| CN | 113129818 | A | 7/2021 | |
| CN | 115527487 | A | 12/2022 | |
| CN | 115938276 | A | 4/2023 | |
| WO | WO-2019109673 | A1 * | 6/2019 | G09G 3/3208 |
| WO | WO-2023201678 | A1 * | 10/2023 | G09G 3/3233 |

* cited by examiner

PIXEL DRIVING CIRCUIT AND DISPLAY APPARATUS

CROSS-REFERENCE TO RELATED APPLICATION

This application is a national stage application under 35 U.S.C. § 371 of International Application No. PCT/CN2023/073090, filed Jan. 19, 2023, the contents of which are incorporated by reference in the entirety.

TECHNICAL FIELD

The present invention relates to display technology, more particularly, to a pixel driving circuit and a display apparatus.

BACKGROUND

Organic Light Emitting Diode (OLED) display is one of the hotspots in the field of flat panel display research today. Unlike Thin Film Transistor-Liquid Crystal Display (TFT-LCD), which uses a stable voltage to control brightness, OLED is driven by a driving current required to be kept constant to control illumination. The OLED display panel includes a plurality of pixel units configured with pixel-driving circuits arranged in multiple rows and columns. Each pixel-driving circuit includes a driving transistor having a gate terminal connected to one gate line per row and a drain terminal connected to one data line per column. When the row in which the pixel unit is gated is turned on, the switching transistor connected to the driving transistor is turned on, and the data voltage is applied from the data line to the driving transistor via the switching transistor, so that the driving transistor outputs a current corresponding to the data voltage to an OLED device. The OLED device is driven to emit light of a corresponding brightness.

SUMMARY

In one aspect, the present disclosure provides a pixel driving circuit, comprising: a driving transistor; a storage capacitor having a first capacitor electrode and a second capacitor electrode; a coupling capacitor having a third capacitor electrode and a fourth capacitor electrode; a control transistor; and a data write transistor having a gate electrode connected to a gate line, a first electrode connected to a data line, and a second electrode connected to a first electrode of the control transistor; wherein the control transistor has a gate electrode connected to a fourth control signal line, a first electrode connected to the second electrode of the data write transistor, and a second electrode connected to the first capacitor electrode and the fourth capacitor electrode; a gate electrode of the driving transistor is connected to the third capacitor electrode; and the control transistor is an n-type transistor.

Optionally, the data write transistor is a p-type transistor.

Optionally, the pixel driving circuit further comprises a compensating transistor having a gate electrode connected to a first control signal line; a first electrode connected to the first capacitor electrode, the fourth capacitor electrode, and the second electrode of the control transistor; and a second electrode connected to a first electrode of the driving transistor.

Optionally, the compensating transistor is an n-type transistor; and the first control signal line and the fourth control signal line are connected to a same scan circuit, and are configured to receive output signals of different stages, respectively, from the same scan circuit.

Optionally, the pixel driving circuit further comprises a first reset transistor having a gate electrode connected to a first control signal line, a first electrode connected to a first reset signal line, and a second electrode connected to the gate electrode of the driving transistor and the third capacitor electrode.

Optionally, the first reset transistor is an n-type transistor; and the first control signal line and the fourth control signal line are connected to a same scan circuit, and are configured to receive output signals of different stages, respectively, from the same scan circuit.

Optionally, the pixel driving circuit further comprises: a compensating transistor having a gate electrode connected to a first control signal line; a first electrode connected to the first capacitor electrode, the fourth capacitor electrode, and the second electrode of the control transistor; and a second electrode connected to a first electrode of the driving transistor; and a first reset transistor having a gate electrode connected to the first control signal line, a first electrode connected to a first reset signal line, and a second electrode connected to the gate electrode of the driving transistor and the third capacitor electrode; wherein the compensating transistor and the first reset transistor are an n-type transistor; the first control signal line and the fourth control signal line are connected to a same scan circuit, and are configured to receive output signals of different stages, respectively, from the same scan circuit.

Optionally, the pixel driving circuit further comprises a third reset transistor having a gate electrode connected to a third control signal line; a first electrode connected to a third reset signal line; and a second electrode connected to a first electrode of the driving transistor, a second electrode of a light emitting control transistor, and a second electrode of a compensating transistor.

Optionally, the third control signal line and the gate line are connected to a same scan circuit, and are configured to receive output signals of different stages, respectively, from the same scan circuit.

Optionally, the third reset transistor and the data write transistor are p-type transistors.

In another aspect, the present disclosure provides a display apparatus, comprising the pixel driving circuit described herein, and one or more scan circuits configured to provide control signals to the pixel driving circuit.

Optionally, the pixel driving circuit further comprises a compensating transistor having a gate electrode connected to a first control signal line; a first electrode connected to the first capacitor electrode, the fourth capacitor electrode, and the second electrode of the control transistor; and a second electrode connected to a first electrode of the driving transistor; the one or more scan circuits comprise a first scan circuit; the compensating transistor is an n-type transistor; and the first control signal line and the fourth control signal line are connected to the first scan circuit, and are configured to receive output signals of different stages, respectively, from the first scan circuit.

Optionally, the pixel driving circuit further comprises a first reset transistor having a gate electrode connected to a first control signal line, a first electrode connected to a first reset signal line, and a second electrode connected to the gate electrode of the driving transistor and the third capacitor electrode; the one or more scan circuits comprise a first scan circuit; the first reset transistor is an n-type transistor; and the first control signal line and the fourth control signal line line are connected to the first scan circuit, and are configured to receive output signals of different stages, respectively, from the first scan circuit.

Optionally, the pixel driving circuit further comprises: a compensating transistor having a gate electrode connected to a first control signal line; a first electrode connected to the first capacitor electrode, the fourth capacitor electrode, and the second electrode of the control transistor; and a second electrode connected to a first electrode of the driving transistor; and a first reset transistor having a gate electrode connected to the first control signal line, a first electrode connected to a first reset signal line, and a second electrode connected to the gate electrode of the driving transistor and the third capacitor electrode; the one or more scan circuits comprise a first scan circuit; the compensating transistor and the first reset transistor are an n-type transistor; and the first control signal line and the fourth control signal line are connected to the first scan circuit, and are configured to receive output signals of different stages, respectively, from the first scan circuit.

Optionally, the pixel driving circuit further comprises a third reset transistor having a gate electrode connected to a third control signal line; a first electrode connected to a third reset signal line; and a second electrode connected to a first electrode of the driving transistor, a second electrode of a light emitting control transistor, and a second electrode of a compensating transistor; the one or more scan circuits comprise a second scan circuit; and the third control signal line and the gate line are connected to the second scan circuit, and are configured to receive output signals of different stages, respectively, from the second scan circuit.

In another aspect, the present disclosure provides a method of operating a pixel driving circuit comprising a driving transistor; a storage capacitor having a first capacitor electrode and a second capacitor electrode; a coupling capacitor having a third capacitor electrode and a fourth capacitor electrode; a control transistor; and a data write transistor having a gate electrode connected to a gate line, a first electrode connected to a data line, and a second electrode connected to a first electrode of the control transistor, wherein the control transistor has a gate electrode connected to a fourth control signal line, a first electrode connected to the second electrode of the data write transistor, and a second electrode connected to the first capacitor electrode and the fourth capacitor electrode; a gate electrode of the driving transistor is connected to the third capacitor electrode; and the control transistor is an n-type transistor; wherein the method comprises, in a data write phase of a frame of image, providing a turning on control signal through the gate line to the gate electrode of the data write transistor; and providing a turning on control signal through the fourth control signal line to the gate electrode of the control transistor.

Optionally, the pixel driving circuit further comprises a compensating transistor having a gate electrode connected to a first control signal line; a first electrode connected to the first capacitor electrode, the fourth capacitor electrode, and the second electrode of the control transistor; and a second electrode connected to a first electrode of the driving transistor; the compensating transistor is an n-type transistor; and the method further comprises providing output signals of different stages from a first scan circuit to the first control signal line and the fourth control signal line, respectively.

Optionally, the pixel driving circuit further comprises a first reset transistor having a gate electrode connected to a first control signal line, a first electrode connected to a first reset signal line, and a second electrode connected to the gate electrode of the driving transistor and the third capacitor electrode; and the method further comprises providing output signals of different stages from a first scan circuit to the first control signal line and the fourth control signal line, respectively.

Optionally, the pixel driving circuit further comprises: a compensating transistor having a gate electrode connected to a first control signal line; a first electrode connected to the first capacitor electrode, the fourth capacitor electrode, and the second electrode of the control transistor; and a second electrode connected to a first electrode of the driving transistor; and a first reset transistor having a gate electrode connected to the first control signal line, a first electrode connected to a first reset signal line, and a second electrode connected to the gate electrode of the driving transistor and the third capacitor electrode; wherein the compensating transistor and the first reset transistor are an n-type transistor; and the method further comprises providing output signals of different stages from a first scan circuit to the first control signal line and the fourth control signal line, respectively.

Optionally, the pixel driving circuit further comprises a third reset transistor having a gate electrode connected to a third control signal line; a first electrode connected to a third reset signal line; and a second electrode connected to a first electrode of the driving transistor, a second electrode of a light emitting control transistor, and a second electrode of a compensating transistor; and the method further comprises providing output signals of different stages from a second scan circuit to the third control signal line and the gate line, respectively.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a pixel driving circuit and a display apparatus that substantially obviate one or more of the problems due to limitations and disadvantages of the related art. In one aspect, the present disclosure provides a pixel driving circuit. In some embodiments, the pixel driving circuit includes a driving transistor; a storage capacitor having a first capacitor electrode and a second capacitor electrode; a coupling capacitor having a third capacitor electrode and a fourth capacitor electrode; a control transistor; and a data write transistor having a gate electrode connected to a gate line, a first electrode connected to a data line, and a second electrode connected a first electrode of the control transistor. Optionally, the control transistor has a gate electrode connected to a fourth control signal line, a first electrode connected to the second electrode of the data write transistor, and a second electrode connected to the first capacitor electrode and the fourth capacitor electrode. Optionally, a gate electrode of the driving transistor is connected to the third capacitor electrode. Optionally, the control transistor is an n-type transistor.

Various appropriate pixel driving circuits may be used in the present array substrate. Examples of appropriate driving circuits include 3T1C, 2T1C, 4T1C, 4T2C, 5T2C, 6T1C, 7T1C, 7T2C, 8T1C, and 8T2C. In some embodiments, the respective one of the plurality of pixel driving circuits is an 7T1C driving circuit. Various appropriate light emitting elements may be used in the present array substrate. Examples of appropriate light emitting elements include organic light emitting diodes, quantum dots light emitting diodes, and micro light emitting diodes. Optionally, the light emitting element is micro light emitting diode. Optionally, the light emitting element is an organic light emitting diode including an organic light emitting layer.

Figure 1:
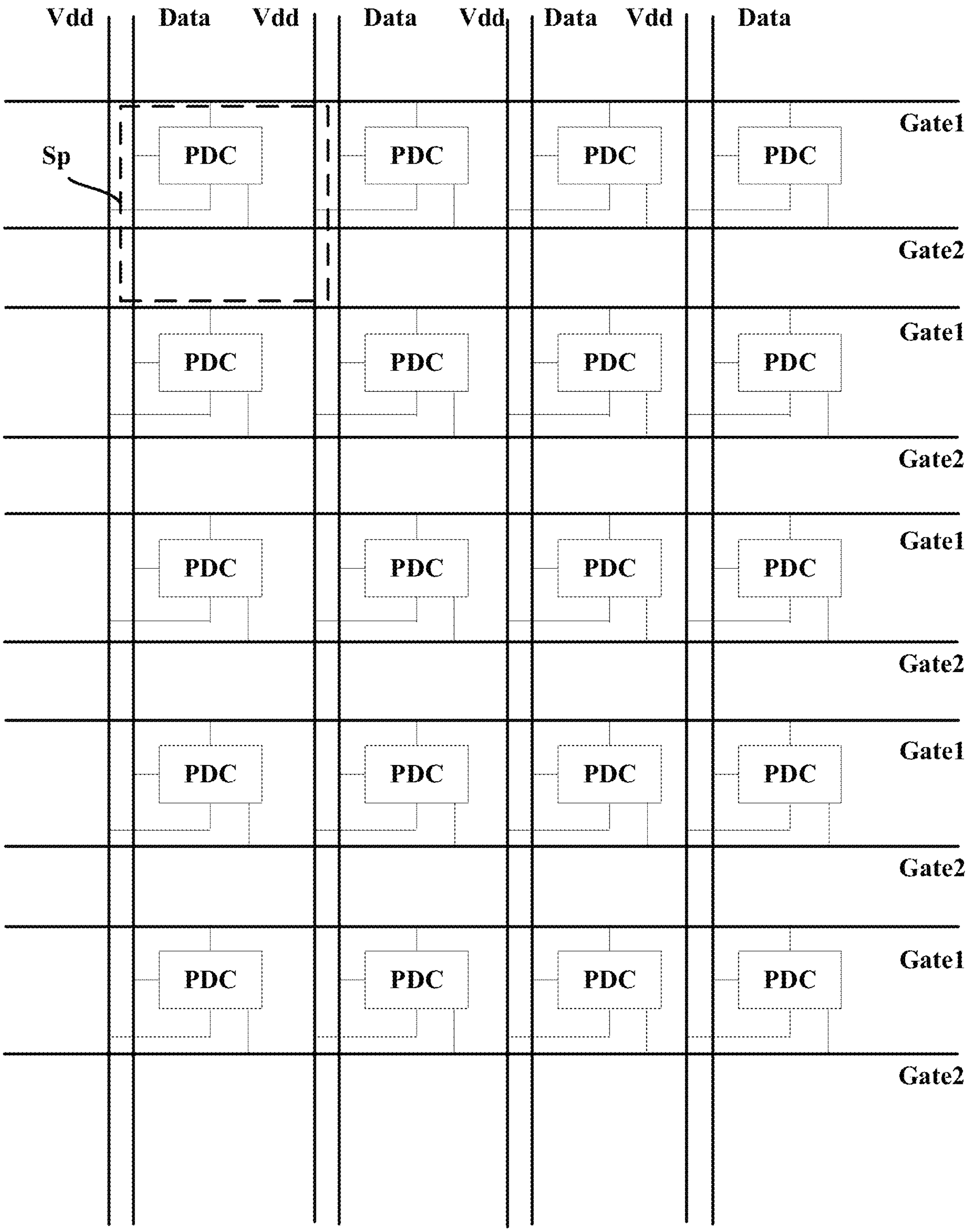
FIG. 1 is a plan view of a display substrate in some embodiments according to the present disclosure.

FIG. 1 is a plan view of an array substrate in some embodiments according to the present disclosure. Referring to FIG. 1, the array substrate includes an array of subpixels Sp. Each subpixel includes an electronic component, e.g., a light emitting element. In one example, the light emitting element is driven by a respective pixel driving circuit PDC. The array substrate includes a plurality of first gate lines Gate1, a plurality of second gate lines Gate2, a plurality of data lines Data, a plurality of voltage supply line Vdd, and a respective second voltage supply line (e.g., a low voltage supply line Vss). Light emission in a respective subpixel Sp is driven by a respective pixel driving circuit PDC. In one example, a high voltage signal (e.g., a VDD signal) is input, through the respective high voltage supply line of the plurality of voltage supply line Vdd, to the respective pixel driving circuit PDC connected to an anode of the light emitting element; a low voltage signal (e.g., a VSS signal) is input, through a low voltage supply line Vss, to a cathode of the light emitting element. A voltage difference between the high voltage signal (e.g., the VDD signal) and the low voltage signal (e.g., the VSS signal) is a driving voltage ΔV that drives light emission in the light emitting element.

Figure 2:
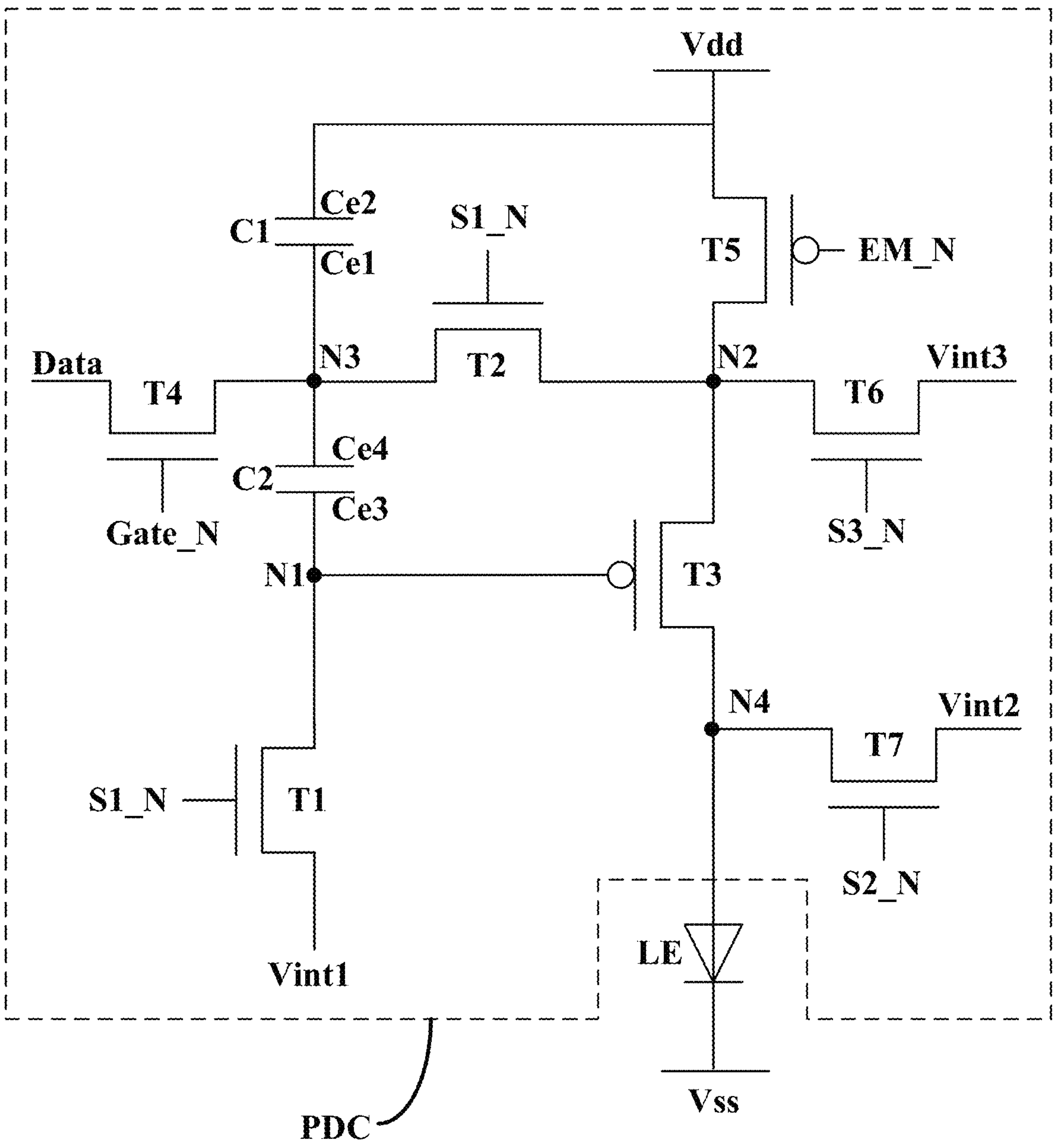
FIG. 2 is a circuit diagram illustrating the structure of a pixel driving circuit in some embodiments according to the present disclosure.

FIG. 2 is a circuit diagram illustrating the structure of a pixel driving circuit in some embodiments according to the present disclosure. Referring to FIG. 1, the pixel driving circuit includes a driving transistor T3, a storage capacitor C1 having a first capacitor electrode Ce1 and a second capacitor electrode Ce2; a coupling capacitor C2 having a third capacitor electrode Ce3 and a fourth capacitor electrode Ce4; a data write transistor T4 having a gate electrode connected to a first gate line Gate_N, a first electrode connected to a data line Data, and a second electrode connected to the first capacitor electrode Ce1 and the fourth capacitor electrode Ce4. A gate electrode of the driving transistor T3 is connected to the third capacitor electrode Ce3.

In some embodiments, the pixel driving circuit further includes a compensating transistor T2 having a gate electrode connected to a first control signal line S1_N; a first electrode connected to the first capacitor electrode Ce1, the fourth capacitor electrode Ce4, and the second electrode of the data write transistor T4; and a second electrode connected to a first electrode of the driving transistor T3.

In some embodiments, the first capacitor electrode Ce1 of the storage capacitor C1 is connected to the second electrode of the data write transistor T4, the first electrode of the compensating transistor T2, and the fourth capacitor electrode Ce4. The second capacitor electrode Ce2 of the storage capacitor C1 is connected to a first voltage supply line Vdd (e.g., a high voltage signal line).

In some embodiments, the fourth capacitor electrode Ce4 of the coupling capacitor C2 is connected to the second electrode of the data write transistor T4, the first electrode of the compensating transistor T2, and the first capacitor electrode Ce1. The third capacitor electrode Ce3 of the coupling capacitor C2 is connected to the gate electrode of the driving transistor T3.

In some embodiments, the pixel driving circuit further includes a light emitting control transistor T5 having a gate electrode connected to a light emitting control signal line EM_N, a first electrode connected to the first voltage supply line Vdd, and a second electrode connected to the first electrode of the driving transistor T3 and the second electrode of the compensating transistor T2.

In some embodiments, the pixel driving circuit further includes at least one reset transistor. In some embodiments, the pixel driving circuit further includes a first reset transistor T1 having a gate electrode connected to a first control signal line S1_N, a first electrode connected to a first reset signal line Vint1, and a second electrode connected to the gate electrode of the driving transistor T3 and the third capacitor electrode Ce3 of the coupling capacitor C2.

In some embodiments, the pixel driving circuit further includes a second reset transistor T7 having a gate electrode connected to a second control signal line S2_N, a first electrode connected to a second reset signal line Vint2, and a second electrode connected to the second electrode of the driving transistor T3 and an anode of a light emitting element LE.

In some embodiments, the pixel driving circuit further includes a third reset transistor T6 having a gate electrode connected to a third control signal line S3_N; a first electrode connected to a third reset signal line Vint3; and a second electrode connected to the first electrode of the driving transistor T3, the second electrode of the light emitting control transistor T5, and the second electrode of the compensating transistor T2.

The pixel driving circuit further include a first node N1, a second node N2, a third node N3, and a fourth node N4. The first node N1 is connected to the gate electrode of the driving transistor T3, the third capacitor electrode Ce3, and the second electrode of the first reset transistor T1. The second node N2 is connected to the first electrode of the driving transistor T3, the second electrode of the light emitting control transistor T5, the second electrode of the compensating transistor T2, and the second electrode of the third reset transistor T6. The third node N3 is connected to the second electrode of the data write transistor T4, the first electrode of the compensating transistor T2, the first capacitor electrode Ce1, and the fourth capacitor electrode Ce4. The fourth node N4 is connected to the second electrode of the driving transistor T3, the second electrode of the second reset transistor T7, and the anode of the light emitting element LE.

As used herein, a first electrode or a second electrode refers to one of a first terminal and a second terminal of a transistor, the first terminal and the second terminal being connected to an active layer of the transistor. A direction of a current flowing through the transistor may be configured to be from a first electrode to a second electrode, or from a second electrode to a first electrode. Accordingly, depending on the direction of the current flowing through the transistor, in one example, the first electrode is configured to receive an input signal and the second electrode is configured to output an output signal; in another example, the second electrode is configured to receive an input signal and the first electrode is configured to output an output signal.

The present disclosure may be implemented in pixel driving circuit having transistors of various types, including a pixel driving circuit having p-type transistors, a pixel driving circuit having n-type transistors, and a pixel driving circuit having one or more p-type transistors and one or more n-type transistors. Referring to FIG. 2, the data write transistor T4, the compensating transistor T2, the first reset transistor T1, the second reset transistor T7, and the third reset transistor T6 are n-type transistors such as metal oxide transistors, and the driving transistor T3 and the light emitting control transistor T5 are p-type transistors such as polysilicon transistors. For a p-type transistor, an effective control signal (e.g., a turn-on control signal) is a low voltage signal, and an ineffective control signal (e.g., a turn-off control signal) is a high voltage signal. For an n-type transistor, an effective control signal (e.g., a turn-on control signal) is a high voltage signal, and an ineffective control signal (e.g., a turn-off control signal) is a low voltage signal.

Figure 3:
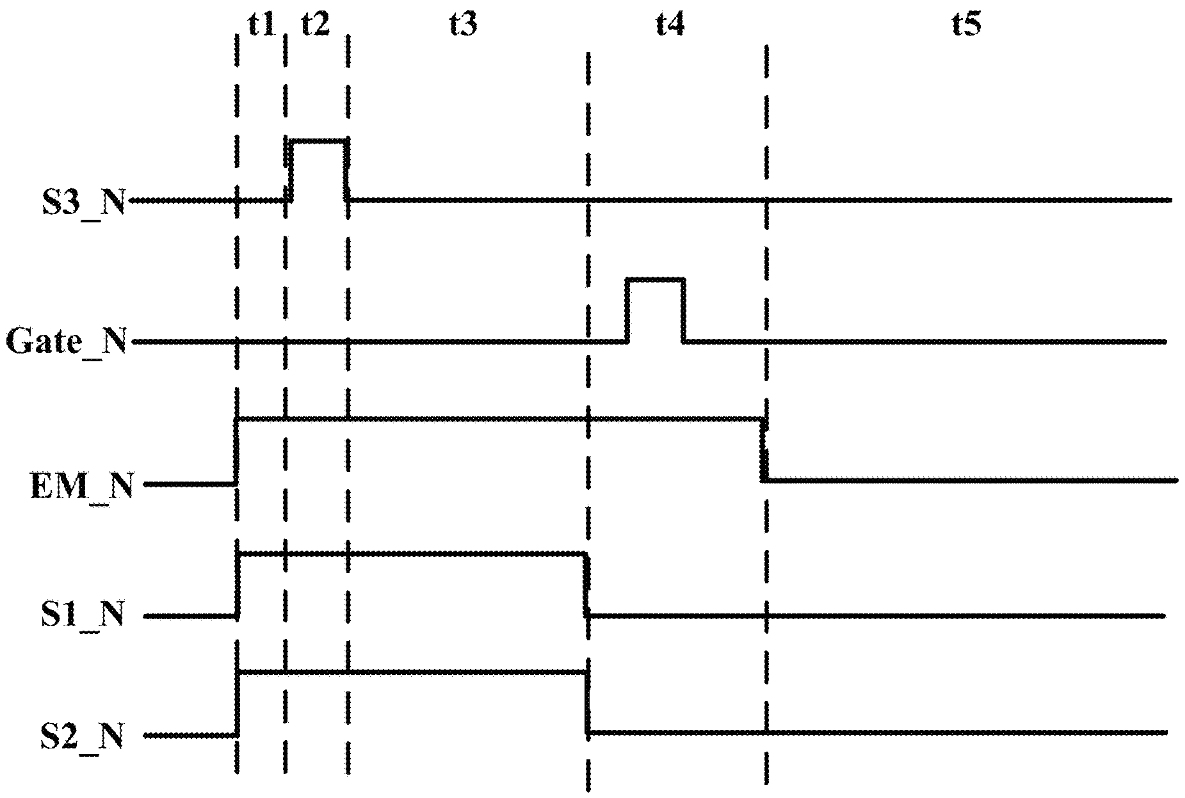
FIG. 3 is a timing diagram illustrating the operation of a pixel driving circuit in some embodiments according to the present disclosure.

FIG. 3 is a timing diagram illustrating the operation of a pixel driving circuit in some embodiments according to the present disclosure. Referring to FIG. 2 and FIG. 3, during one frame of image, the operation of the pixel driving circuit includes a first phase t1, a second phase t2, a third phase t3, a fourth phase t4, and a fifth phase t5.

Figure 4A:
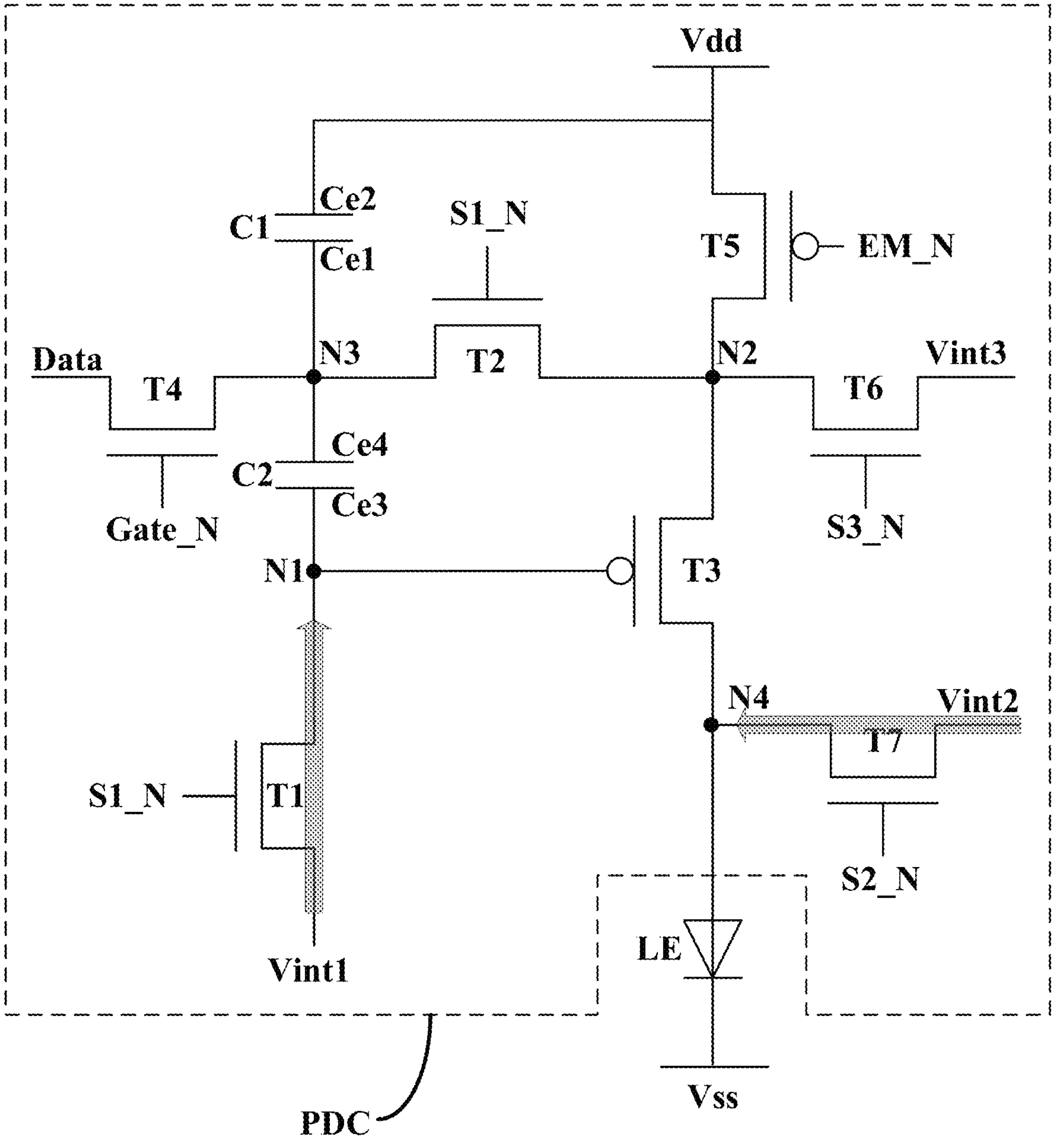
FIG. 4A illustrates a current pathway in a phase t1 of a frame of image in a pixel driving circuit in some embodiments according to the present disclosure.

In the first phase t1, a turning-on control signal is provided through the first control signal line S1_N to the gate electrode of the first reset transistor T1 to turn on the first reset transistor T1, allowing a reset signal from the first reset signal line Vint1 to pass from a first electrode of the first reset transistor T1 to a second electrode of the first reset transistor T1, and in turn to the third capacitor electrode Ce3 and the gate electrode of the driving transistor T3. The node N1 (the gate electrode of the driving transistor T3) is reset. The turning-on control signal is also provided through the first control signal line S1_N to the gate electrode of the compensating transistor T2 to turn on the compensating transistor T2. A turning-on control signal is provided through the second control signal line S2_N to the gate electrode of the second reset transistor T7 to turn on the second reset transistor T7, allowing a reset signal from the second reset signal line Vint2 to pass from a first electrode of the second reset transistor T7 to a second electrode of the second reset transistor T7, and in turn to the second electrode of the driving transistor T3 and the anode of the light emitting element LE. The node N4 (the anode of the light emitting element LE) is reset. A turning-off light emitting control signal is provided through the light emitting control signal line EM_N to the gate electrode of the light emitting control transistor T5 to turn off the light emitting control transistor T5. A turning-off control signal is provided through the third control signal line S3_N to the gate electrode of the third reset transistor T6 to turn off the third reset transistor T6. A turning-off gate signal is provided through the first gate line Gate_N to the gate electrode of the data write transistor T4 to turn off the data write transistor T4. FIG. 4A illustrates a current pathway in a phase t1 of a frame of image in a pixel driving circuit in some embodiments according to the present disclosure. The shaded arrows in FIG. 4A indicates a current flow in the phase t1.

Figure 4B:
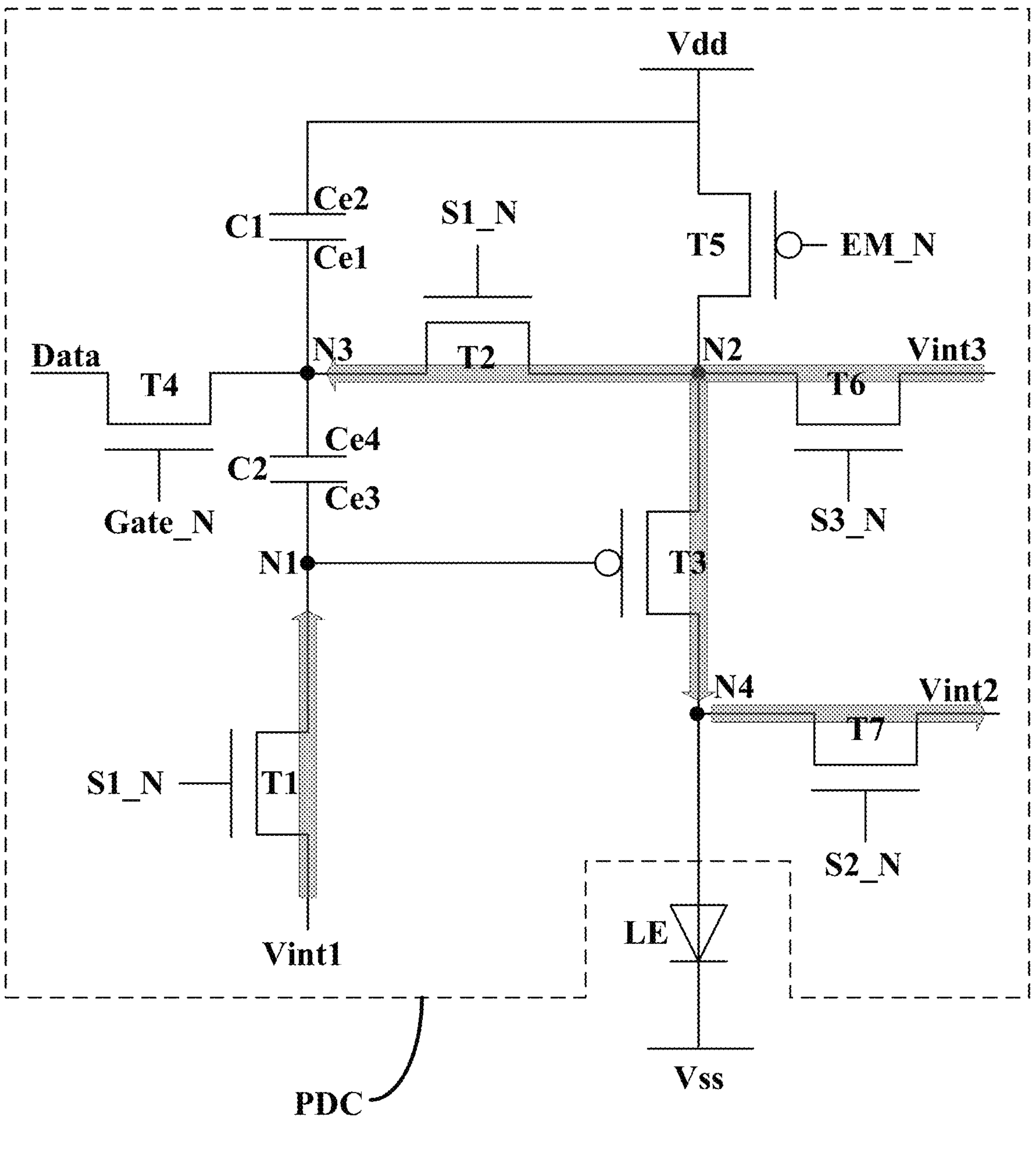
FIG. 4B illustrates a current pathway in a phase t2 of a frame of image in a pixel driving circuit in some embodiments according to the present disclosure.

In the second phase t2, a turning-on control signal is provided through the first control signal line S1_N to the gate electrode of the first reset transistor T1 to turn on the first reset transistor T1, and also provided through the first control signal line S1_N to the gate electrode of the compensating transistor T2 to turn on the compensating transistor T2. A turning-on control signal is provided through the second control signal line S2_N to the gate electrode of the second reset transistor T7 to turn on the second reset transistor T7. A turning-on control signal is provided through the third control signal line S3_N to the gate electrode of the third reset transistor T6 to turn on the third reset transistor T6, allowing a reset signal from the third reset signal line Vint3 to pass from a first electrode of the third reset transistor T6 to a second electrode of the third reset transistor T6, and in turn to the first electrode of the driving transistor T3, the second electrode of the light emitting control transistor T5, and the second electrode of the compensating transistor T2. The node N2 (the first electrode of the driving transistor T3) is charged with a voltage of the third reset signal line Vint3. In some embodiments, the voltage of the third reset signal line Vint3 has a high voltage level, to ensure Vgs<Vth, thereby ensuring the driving transistor T3 remains in a turning-on state. FIG. 4B illustrates a current pathway in a phase t2 of a frame of image in a pixel driving circuit in some embodiments according to the present disclosure. The shaded arrows in FIG. 4B indicates a current flow in the phase t2.

Figure 4C:
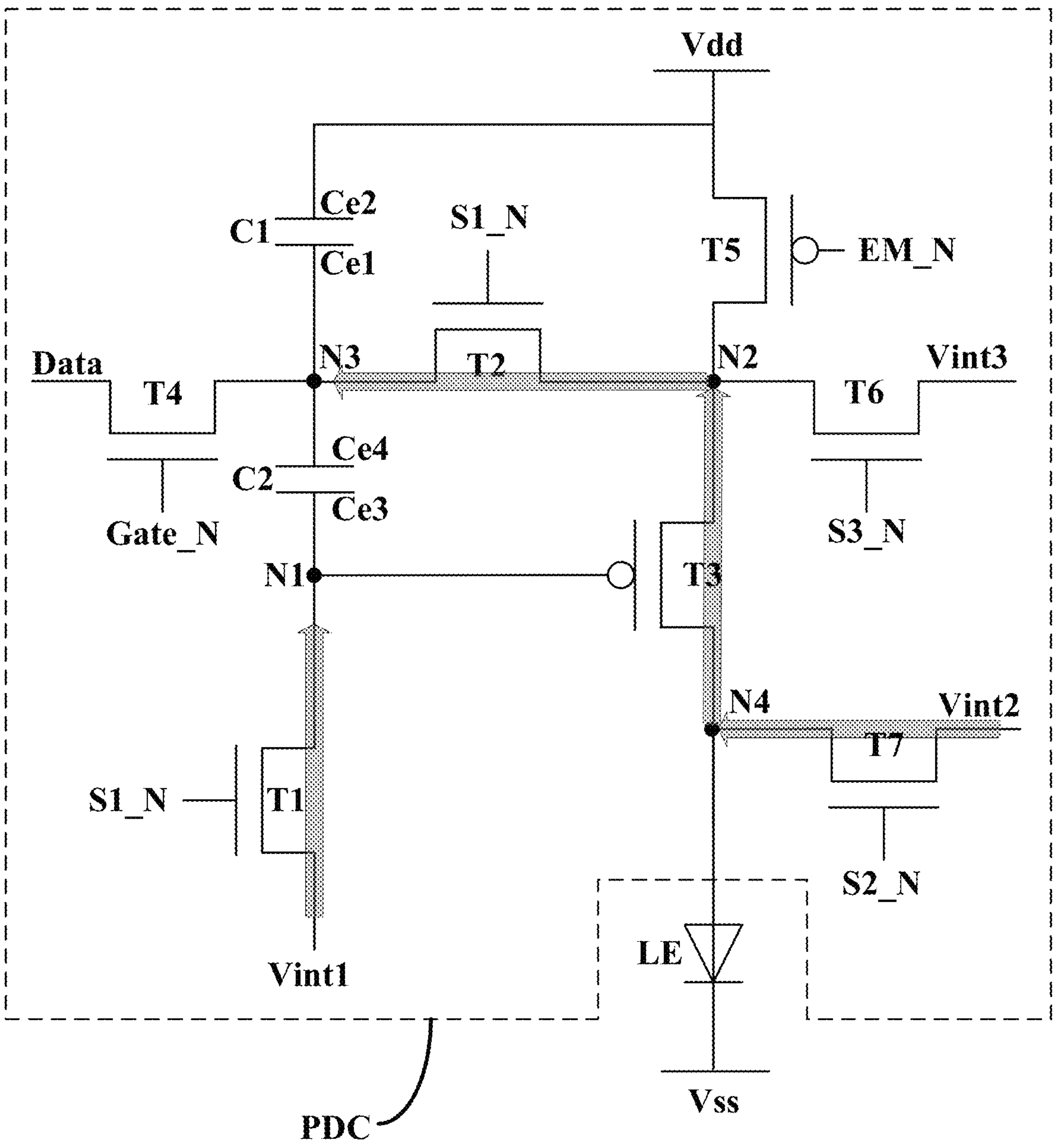
FIG. 4C illustrates a current pathway in a phase t3 of a frame of image in a pixel driving circuit in some embodiments according to the present disclosure.

In the third phase t3 (Vth compensating phase), a turning-off control signal is provided through the third control signal line S3_N to the gate electrode of the third reset transistor T6 to turn off the third reset transistor T6. In the third phase t3, the first reset transistor T1, the compensating transistor T2, the driving transistor T3, and the second reset transistor T7 remain turning on. A second reset signal is provided through the second reset signal line Vint2, the second reset signal passes through the second reset transistor T7 and the driving transistor T3, charging the node N2 (the first electrode of the driving transistor T3). When the node N2 is charged to a point when Vgs=Vth, the driving transistor T3 is turned off. Vgs=VN1−VN2, wherein VN1 is a voltage level at the node N1, and VN2 is a voltage level at the node N2. In the third phase t3, VN1=a voltage level of the first reset signal provided by the first reset signal line Vint1. Thus, VN2=VN1−Vgs=VN1−Vth, i.e., VN2=Vint1−Vth. Because the compensating transistor T2 is turning on in the third phase t3, VN3=VN2=VN1−Vth, wherein VN3 is a voltage level at the node N3. FIG. 4C illustrates a current pathway in a phase t3 of a frame of image in a pixel driving circuit in some embodiments according to the present disclosure. The shaded arrows in FIG. 4C indicates a current flow in the phase t3.

Figure 4D:
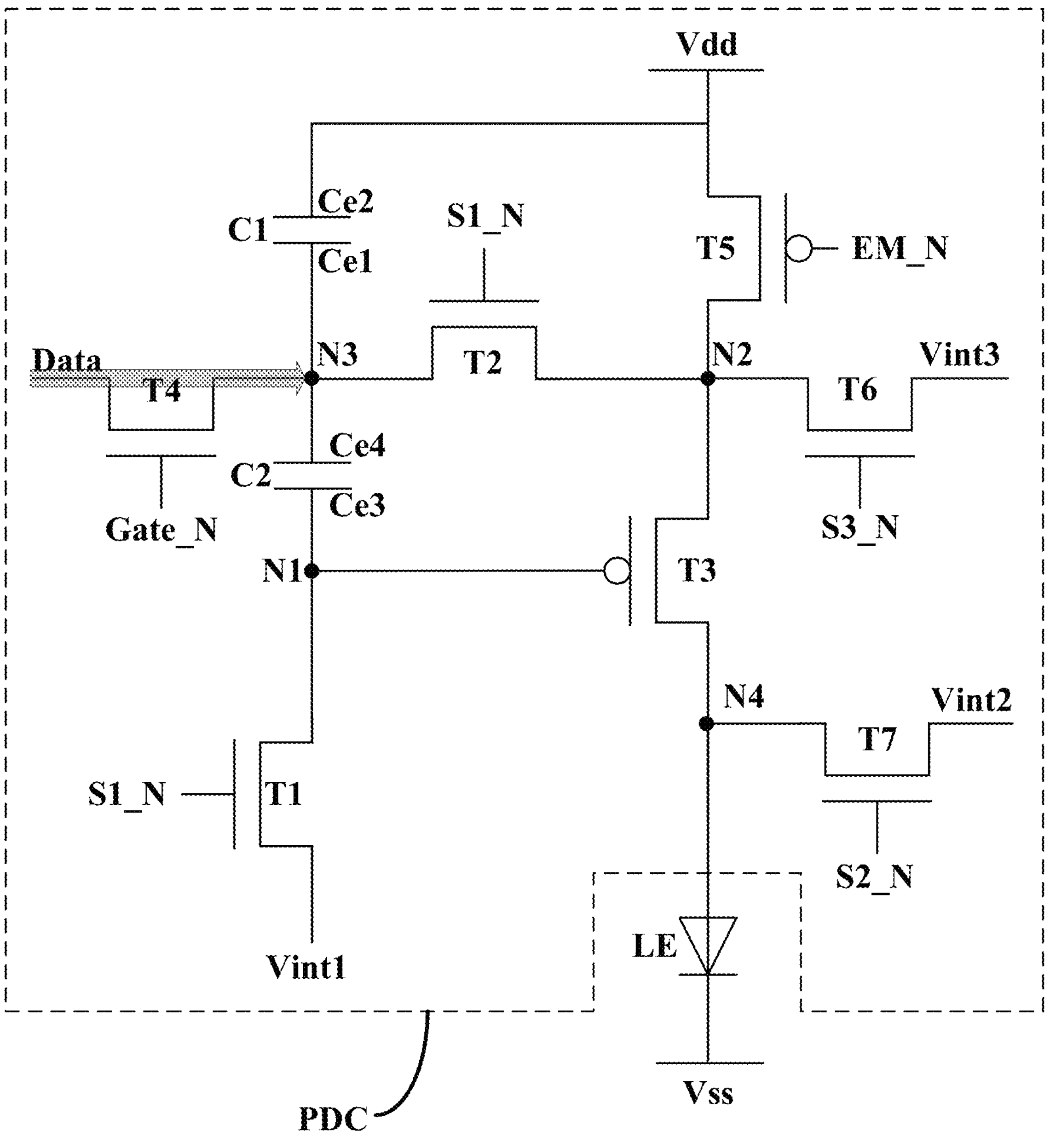
FIG. 4D illustrates a current pathway in a phase t4 of a frame of image in a pixel driving circuit in some embodiments according to the present disclosure.

In the phase t4 (data write phase), a turning-off control signal is provided through the first control signal line S1_N to the gate electrode of the first reset transistor T1 to turn off the first reset transistor T1, and also provided through the first control signal line S1_N to the gate electrode of the compensating transistor T2 to turn off the compensating transistor T2. A turning-off control signal is provided through the second control signal line S2_N to the gate electrode of the second reset transistor T7 to turn off the second reset transistor T7. A turning-on gate signal is provided through the first gate line Gate_N to the gate electrode of the data write transistor T4 to turn on the data write transistor T4, allowing a data signal provided through the data line Data to pass from a first electrode of the data write transistor T4 to a second electrode of the data write transistor T4, and in turn to the node N3. In the phase t3, VN1=a voltage level of the first reset signal provided by the first reset signal line Vint1 (denoted as Vre1). In the phase t4, a voltage level at the node N3 changes from (Vre1−Vth) to a voltage level of the data signal Vdata. The change is ΔVN3=Vdata−Vre1+Vth. The coupling capacitor C2 induces a voltage coupling at the node N1 by ΔVN3. Due to the voltage coupling, VN1 changes to (Vre1+ΔVN3)=(Vre1+Vdata−Vre1+Vth)=(Vdata+Vth), wherein the Vdata is the voltage level of the data voltage signal, and the Vth is the voltage level of the threshold voltage Th of the PN junction of the driving transistor T3. FIG. 4D illustrates a current pathway in a phase t4 of a frame of image in a pixel driving circuit in some embodiments according to the present disclosure. The shaded arrows in FIG. 4D indicates a current flow in the phase t4.

Figure 4E:
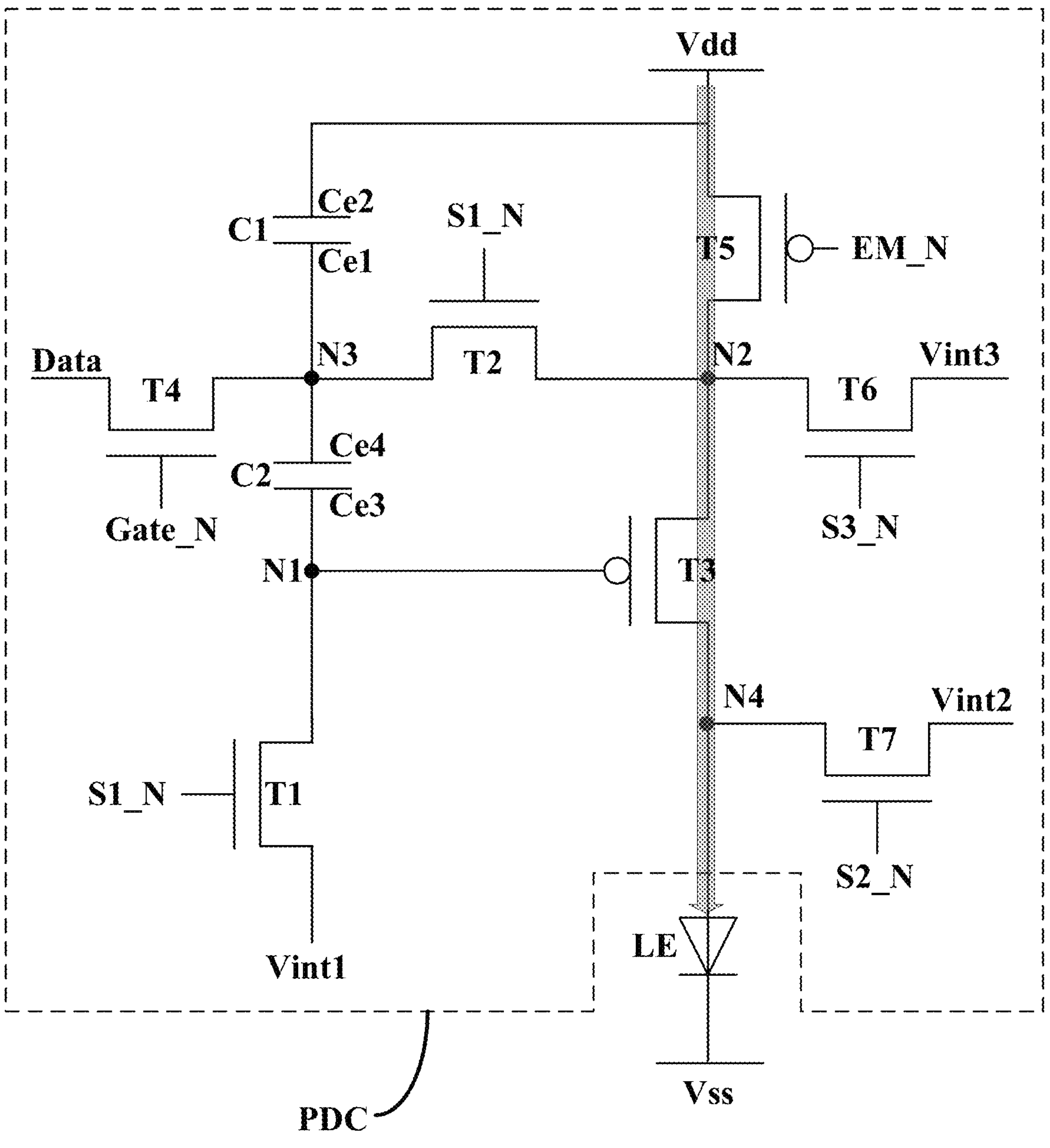
FIG. 4E illustrates a current pathway in a phase t5 of a frame of image in a pixel driving circuit in some embodiments according to the present disclosure.

In the phase t5 (light emission phase), a turning-on light emitting control signal is provided through the light emitting control signal line EM_N to the gate electrode of the light emitting control transistor T5 to turn on the light emitting control transistor T5, allowing a first power supply voltage signal provided through the first voltage supply line Vdd to pass from a first electrode of the light emitting control transistor T5 to a second electrode of the light emitting control transistor T5, in turn pass from a first electrode of the driving transistor T3 to a second electrode of the driving transistor T3, and to the anode of the light emitting element LE. The light emitting element is configured to emit light. FIG. 4E illustrates a current pathway in a phase t5 of a frame of image in a pixel driving circuit in some embodiments according to the present disclosure. The shaded arrows in FIG. 4E indicates a current flow in the phase t5.

The inventors of the present disclosure discover that, by having an n-type transistor (e.g., the data write transistor T4 in FIG. 2) between the data signal line Data and the node N3 (the first electrode of the compensating transistor T2), leakage current from the data signal line Data to the node N3 can be effectively prevented. A voltage level at the node N3 (the fourth capacitor electrode Ce4) can be stabilized, and in turn a voltage level at the node N1 (the third capacitor electrode Ce3) can be stabilized. The n-type transistor (e.g., the data write transistor T4 in FIG. 2) is configured to control supply of the data signal to the node N3 (the first electrode of the compensating transistor T2, the fourth capacitor electrode Ce4, the first capacitor electrode Ce1).

The gate electrode of the n-type transistor configured to control supply of the data signal to the node N3 is connected to a first gate line Gate_N. The inventors of the present disclosure discover that, when an effective control signal of a first gate scanning signal provided to the n-type transistor is pulse having a pulse width equal to or less than 1H, and the pulse has a high voltage level, the leakage current from the data signal line Data to the node N3 can be effectively prevented. H refers to a period of a horizontal sync signal. A scan circuit (e.g., a gate driving circuit or a gate-on-array) can be used to provide the first gate scanning signal.

Figure 5:
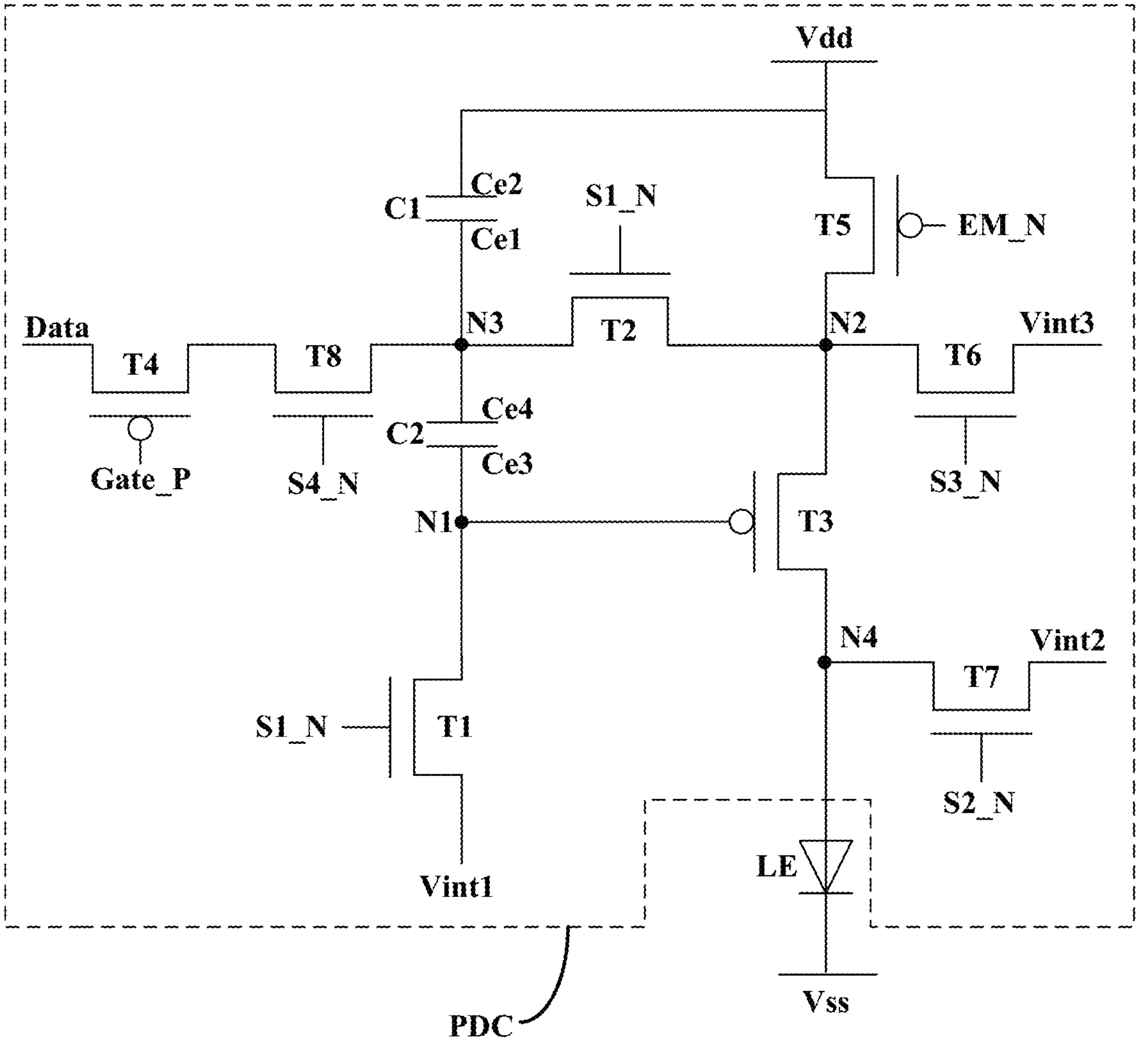
FIG. 5 is a circuit diagram illustrating the structure of a pixel driving circuit in some embodiments according to the present disclosure.

Various appropriate implementations may be practiced in the present disclosure. In the pixel driving circuit depicted in FIG. 2, the n-type transistor configured to control supply of the data signal to the node N3 is the data write transistor T4 having a first electrode connected to the data signal line. FIG. 5 is a circuit diagram illustrating the structure of a pixel driving circuit in some embodiments according to the present disclosure. Referring to FIG. 5, the pixel driving circuit in some embodiments includes a driving transistor T3, a storage capacitor C1 having a first capacitor electrode Ce1 and a second capacitor electrode Ce2; a coupling capacitor C2 having a third capacitor electrode Ce3 and a fourth capacitor electrode Ce4; a data write transistor T4 and a control transistor T8 connect to each other. A gate electrode of the data write transistor T4 is connected to a second gate line Gate_P, a first electrode of the data write transistor T4 is connected to a data line Data, and a second electrode of the data write transistor T4 is connected to a first electrode of the control transistor T8. A gate electrode of the control transistor T8 is connected to a fourth control signal line S4_N, a first electrode of the control transistor T8 is connected to the second electrode of the data write transistor T4, and a second electrode of the control transistor T8 is connected to the first capacitor electrode Ce1 and the fourth capacitor electrode Ce4. A gate electrode of the driving transistor T3 is connected to the third capacitor electrode Ce3.

In some embodiments, the pixel driving circuit further includes a compensating transistor T2 having a gate electrode connected to a first control signal line S1_N; a first electrode connected to the first capacitor electrode Ce1, the fourth capacitor electrode Ce4, and the second electrode of the control transistor T8; and a second electrode connected to a first electrode of the driving transistor T3.

In some embodiments, the first capacitor electrode Ce1 of the storage capacitor C1 is connected to the second electrode of the control transistor T8, the first electrode of the compensating transistor T2, and the fourth capacitor electrode Ce4. The second capacitor electrode Ce2 of the storage capacitor C1 is connected to a first voltage supply line Vdd (e.g., a high voltage signal line).

In some embodiments, the fourth capacitor electrode Ce4 of the coupling capacitor C2 is connected to the second electrode of the control transistor T8, the first electrode of the compensating transistor T2, and the first capacitor electrode Ce1. The third capacitor electrode Ce3 of the coupling capacitor C2 is connected to the gate electrode of the driving transistor T3.

In some embodiments, the pixel driving circuit further includes a light emitting control transistor T5 having a gate electrode connected to a light emitting control signal line EM_N, a first electrode connected to the first voltage supply line Vdd, and a second electrode connected to the first electrode of the driving transistor T3 and the second electrode of the compensating transistor T2.

In some embodiments, the pixel driving circuit further includes at least one reset transistor. In some embodiments, the pixel driving circuit further includes a first reset transistor T1 having a gate electrode connected to a first control signal line S1_N, a first electrode connected to a first reset signal line Vint1, and a second electrode connected to the gate electrode of the driving transistor T3 and the third capacitor electrode Ce3 of the coupling capacitor C2.

In some embodiments, the pixel driving circuit further includes a second reset transistor T7 having a gate electrode connected to a second control signal line S2_N, a first electrode connected to a second reset signal line Vint2, and a second electrode connected to the second electrode of the driving transistor T3 and an anode of a light emitting element LE.

In some embodiments, the pixel driving circuit further includes a third reset transistor T6 having a gate electrode connected to a third control signal line S3_N; a first electrode connected to a third reset signal line Vint3; and a second electrode connected to the first electrode of the driving transistor T3, the second electrode of the light emitting control transistor T5, and the second electrode of the compensating transistor T2.

The pixel driving circuit further include a first node N1, a second node N2, a third node N3, and a fourth node N4. The first node N1 is connected to the gate electrode of the driving transistor T3, the third capacitor electrode Ce3, and the second electrode of the first reset transistor T1. The second node N2 is connected to the first electrode of the driving transistor T3, the second electrode of the light emitting control transistor T5, the second electrode of the compensating transistor T2, and the second electrode of the third reset transistor T6. The third node N3 is connected to the second electrode of the control transistor T8, the first electrode of the compensating transistor T2, the first capacitor electrode Ce1, and the fourth capacitor electrode Ce4. The fourth node N4 is connected to the second electrode of the driving transistor T3, the second electrode of the second reset transistor T7, and the anode of the light emitting element LE.

The present disclosure may be implemented in pixel driving circuit having transistors of various types, including a pixel driving circuit having p-type transistors, a pixel driving circuit having n-type transistors, and a pixel driving circuit having one or more p-type transistors and one or more n-type transistors. Referring to FIG. 5, the control transistor T8, the compensating transistor T2, the first reset transistor T1, the second reset transistor T7, and the third reset transistor T6 are n-type transistors such as metal oxide transistors; and the driving transistor T3, the data write transistor T4, and the light emitting control transistor T5 are p-type transistors such as polysilicon transistors. For a p-type transistor, an effective control signal (e.g., a turn-on control signal) is a low voltage signal, and an ineffective control signal (e.g., a turn-off control signal) is a high voltage signal. For an n-type transistor, an effective control signal (e.g., a turn-on control signal) is a high voltage signal, and an ineffective control signal (e.g., a turn-off control signal) is a low voltage signal.

Figure 6:
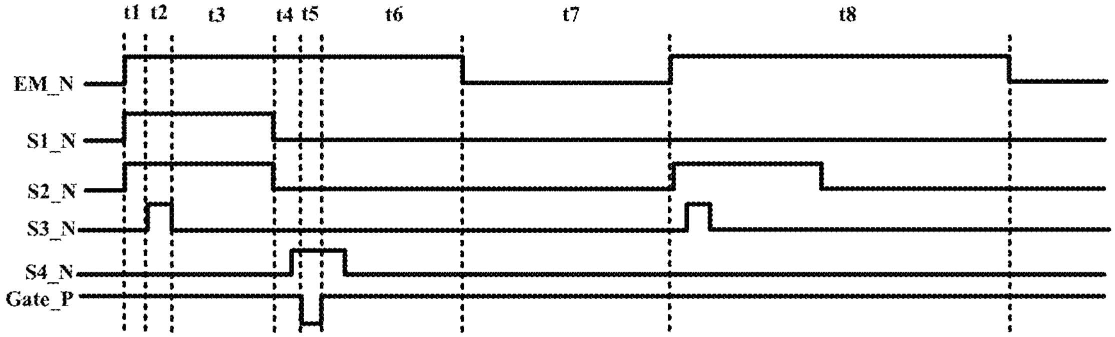
FIG. 6 is a timing diagram illustrating the operation of a pixel driving circuit in some embodiments according to the present disclosure.

Various appropriate driving methods may be implemented in the present disclosure. FIG. 6 is a timing diagram illustrating the operation of a pixel driving circuit in some embodiments according to the present disclosure. Referring to FIG. 5 and FIG. 6, during one frame of image, the operation of the pixel driving circuit includes a first phase t1, a second phase t2, a third phase t3, a fourth phase t4, a fifth phase t5, a sixth phase t6, a seventh phase t7, and an eight phase t8.

In the first phase t1, a turning-on control signal is provided through the first control signal line S1_N to the gate electrode of the first reset transistor T1 to turn on the first reset transistor T1, allowing a reset signal from the first reset signal line Vint1 to pass from a first electrode of the first reset transistor T1 to a second electrode of the first reset transistor T1, and in turn to the third capacitor electrode Ce3 and the gate electrode of the driving transistor T3. The node N1 (the gate electrode of the driving transistor T3) is reset. The turning-on control signal is also provided through the first control signal line S1_N to the gate electrode of the compensating transistor T2 to turn on the compensating transistor T2. A turning-on control signal is provided through the second control signal line S2_N to the gate electrode of the second reset transistor T7 to turn on the second reset transistor T7, allowing a reset signal from the second reset signal line Vint2 to pass from a first electrode of the second reset transistor T7 to a second electrode of the second reset transistor T7, and in turn to the second electrode of the driving transistor T3 and the anode of the light emitting element LE. The node N4 (the anode of the light emitting element LE) is reset. A turning-off light emitting control signal is provided through the light emitting control signal line EM_N to the gate electrode of the light emitting control transistor T5 to turn off the light emitting control transistor T5. A turning-off control signal is provided through the third control signal line S3_N to the gate electrode of the third reset transistor T6 to turn off the third reset transistor T6. A turning-off gate signal is provided through the second gate line Gate_P to the gate electrode of the data write transistor T4 to turn off the data write transistor T4. A turning-off control signal is provided through the fourth control signal line S4_N to the gate electrode of the control transistor T8 to turn off the control transistor T8.

In the second phase t2, a turning-on control signal is provided through the first control signal line S1_N to the gate electrode of the first reset transistor T1 to turn on the first reset transistor T1, and also provided through the first control signal line S1_N to the gate electrode of the compensating transistor T2 to turn on the compensating transistor T2. A turning-on control signal is provided through the second control signal line S2_N to the gate electrode of the second reset transistor T7 to turn on the second reset transistor T7. A turning-on control signal is provided through the third control signal line S3_N to the gate electrode of the third reset transistor T6 to turn on the third reset transistor T6, allowing a reset signal from the third reset signal line Vint3 to pass from a first electrode of the third reset transistor T6 to a second electrode of the third reset transistor T6, and in turn to the first electrode of the driving transistor T3, the second electrode of the light emitting control transistor T5, and the second electrode of the compensating transistor T2. The node N2 (the first electrode of the driving transistor T3) is charged with a voltage of the third reset signal line Vint3. In some embodiments, the voltage of the third reset signal line Vint3 has a high voltage level, to ensure Vgs<Vth, thereby ensuring the driving transistor T3 remains in a turning-on state. A turning-off gate signal is provided through the second gate line Gate_P to the gate electrode of the data write transistor T4 to turn off the data write transistor T4. A turning-off control signal is provided through the fourth control signal line S4_N to the gate electrode of the control transistor T8 to turn off the control transistor T8.

In the third phase t3 (Vth compensating phase), a turning-off control signal is provided through the third control signal line S3_N to the gate electrode of the third reset transistor T6 to turn off the third reset transistor T6. In the third phase t3, the first reset transistor T1, the compensating transistor T2, the driving transistor T3, and the second reset transistor T7 remain turning on. A second reset signal is provided through the second reset signal line Vint2, the second reset signal passes through the second reset transistor T7 and the driving transistor T3, charging the node N2 (the first electrode of the driving transistor T3). When the node N2 is charged to a point when Vgs=Vth, the driving transistor T3 is turned off. Vgs=VN1−VN2, wherein VN1 is a voltage level at the node N1, and VN2 is a voltage level at the node N2. In the third phase t3, VN1=a voltage level of the first reset signal provided by the first reset signal line Vint1. Thus, VN2=VN1−Vgs=VN1−Vth, i.e., VN2=Vint1−Vth. Because the compensating transistor T2 is turning on in the third phase t3, VN3=VN2=VN1−Vth, wherein VN3 is a voltage level at the node N3. A turning-off gate signal is provided through the second gate line Gate_P to the gate electrode of the data write transistor T4 to turn off the data write transistor T4. A turning-off control signal is provided through the fourth control signal line S4_N to the gate electrode of the control transistor T8 to turn off the control transistor T8.

In the phase t4, a turning-off control signal is provided through the first control signal line S1_N to the gate electrode of the first reset transistor T1 to turn off the first reset transistor T1, and also provided through the first control signal line S1_N to the gate electrode of the compensating transistor T2 to turn off the compensating transistor T2. A turning-off control signal is provided through the second control signal line S2_N to the gate electrode of the second reset transistor T7 to turn off the second reset transistor T7. Optionally, in the middle of the phase t4, a turning-on control signal is provided through the fourth control signal line S4_N to the gate electrode of the control transistor T8 to turn on the control transistor T8. A turning-off gate signal is provided through the second gate line Gate_P to the gate electrode of the data write transistor T4 to turn off the data write transistor T4. In the phase t4, the data signal is not provided to the node N3.

In the phase t5 (data write phase), a turning-off control signal is provided through the first control signal line S1_N to the gate electrode of the first reset transistor T1 to turn off the first reset transistor T1, and also provided through the first control signal line S1_N to the gate electrode of the compensating transistor T2 to turn off the compensating transistor T2. A turning-off control signal is provided through the second control signal line S2_N to the gate electrode of the second reset transistor T7 to turn off the second reset transistor T7. A turning-on control signal is provided through the fourth control signal line S4_N to the gate electrode of the control transistor T8 to turn on the control transistor T8. In the phase t5, a turning-on gate signal is provided through the second gate line Gate_P to the gate electrode of the data write transistor T4 to turn on the data write transistor T4. In the phase t5, both the data write transistor T4 and the control transistor T8 are turned on, allowing a data signal provided through the data line Data to pass from a first electrode of the data write transistor T4 to a second electrode of the data write transistor T4, then pass from a first electrode of the control transistor T8 to a second electrode of the control transistor T8, and in turn to the node N3. In the phase t4, VN1=a voltage level of the first reset signal provided by the first reset signal line Vint1 (denoted as Vre1). In the phase t5, a voltage level at the node N3 changes from (Vre1−Vth) to a voltage level of the data signal Vdata. The change is ΔVN3=Vdata−Vre1+Vth. The coupling capacitor C2 induces a voltage coupling at the node N1 by ΔVN3. Due to the voltage coupling, VN1 changes to (Vre1+ΔVN3)=(Vre1+Vdata−Vre1+Vth)=(Vdata+Vth), wherein the Vdata is the voltage level of the data voltage signal, and the Vth is the voltage level of the threshold voltage Th of the PN junction of the driving transistor T3.

In the phase t6, a turning-off gate signal is provided through the second gate line Gate_P to the gate electrode of the data write transistor T4 to turn off the data write transistor T4. In the middle of the phase t6, a turning-off control signal is provided through the fourth control signal line S4_N to the gate electrode of the control transistor T8 to turn off the control transistor T8. Both the data write transistor T4 and the control transistor T8 are turned off, effectively preventing leakage current from the data signal line Data.

In the phase t7 (light emission phase), a turning-on light emitting control signal is provided through the light emitting control signal line EM_N to the gate electrode of the light emitting control transistor T5 to turn on the light emitting control transistor T5, allowing a first power supply voltage signal provided through the first voltage supply line Vdd to pass from a first electrode of the light emitting control transistor T5 to a second electrode of the light emitting control transistor T5, in turn pass from a first electrode of the driving transistor T3 to a second electrode of the driving transistor T3, and to the anode of the light emitting element LE. The light emitting element is configured to emit light.

The phase t8 is a blanking phase of the frame of image.

Referring to FIG. 6, in some embodiments, a first period during which the control transistor T8 is turned on is longer than a second period during which the data write transistor T4 is turned on. The second period is a sub-period of the first period.

The inventors of the present disclosure discover that, by having an n-type transistor (e.g., the control transistor T8 in FIG. 5) between the data signal line Data and the node N3 (the first electrode of the compensating transistor T2), leakage current from the data signal line Data to the node N3 can be effectively prevented. A voltage level at the node N3 (the fourth capacitor electrode Ce4) can be stabilized, and in turn a voltage level at the node N1 (the third capacitor electrode Ce3) can be stabilized. The n-type transistor (e.g., the control transistor T8 in FIG. 5 in concert with the data write transistor T4) is configured to control supply of the data signal to the node N3 (the first electrode of the compensating transistor T2, the fourth capacitor electrode Ce4, the first capacitor electrode Ce1).

The gate electrode of the data write transistor T4 is controlled by the second gate scanning signal provided by the second gate line Gate_P, the gate electrode of the control transistor T8 is controlled by a fourth control signal provided by the fourth control signal line S4_N. Two different scan circuits may be used to provide the second gate scanning signal to the second gate line Gate_P, and provide the fourth control signal to the fourth control signal line S4_N. For example, a gate scanning signal generating circuit is configured to generate gate scanning signals for the second gate line Gate_P, and a light emitting control signal generating circuit is configured to generate control signals for the fourth control signal line S4_N.

Various alternative driving methods may be practiced in the present disclosure. For example, the fourth control signal line S4_N may share a same scan circuit with one or more control signal lines or gate lines, however, configured to receive an output from the same scan circuit at a different stage. Optionally, the one or more control signal lines or gate lines are configured to receive an output signal of a present stage, and the fourth control signal line S4_N is configured to receive an output signal of a previous stage. Optionally, the one or more control signal lines or gate lines are configured to receive an output signal of a present stage, and the fourth control signal line S4_N is configured to receive an output signal of a later stage. Optionally, the one or more control signal lines or gate lines are configured to receive a m-th stage output from the same scan circuit, and the fourth control signal line S4_N is configured to receive a (m−n)-th stage output from the same scan circuit, m and n being positive integers, m>n. Optionally, the one or more control signal lines or gate lines are configured to receive a m-th stage output from the same scan circuit, and the fourth control signal line S4_N is configured to receive a (m+n)-th stage output from the same scan circuit, m and n being positive integers, n>m.

Figure 7:
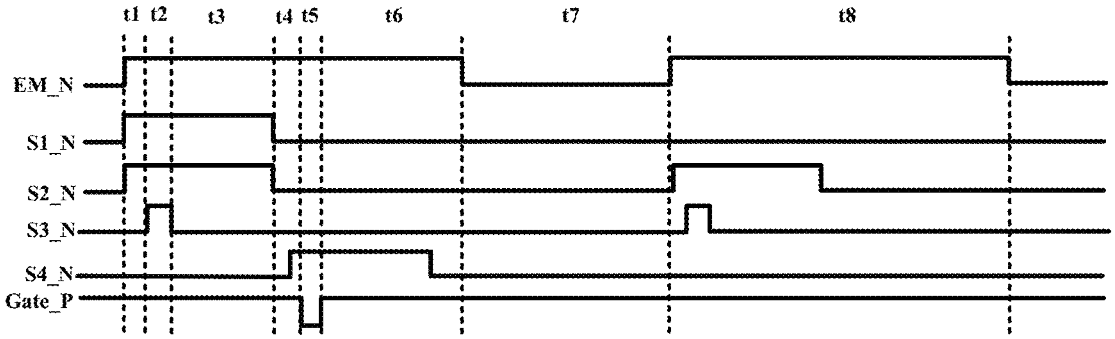
FIG. 7 is a timing diagram illustrating the operation of a pixel driving circuit in some embodiments according to the present disclosure.

FIG. 7 is a timing diagram illustrating the operation of a pixel driving circuit in some embodiments according to the present disclosure. Referring to FIG. 7, the fourth control signal line S4_N and the first control signal line S1_N are configured to receive output signals of different stages, respectively, from a same scan circuit. Optionally, the first control signal line S1_N is configured to receive an output signal of a present stage, and the fourth control signal line S4_N is configured to receive an output signal of a previous stage (not necessarily an immediately previous stage). An effective voltage of the output signal from the same scan circuit is provided to the fourth control signal line S4_N at a time point in the middle of the phase t4, e.g., after the output signal provided to the first control signal line S1_N becomes an ineffective voltage. The second control signal line S2_N and the third control signal line S3_N are configured to receive control signals from independent scan circuits, so that the first electrode and the gate electrode of the driving transistor T3 can be reset during the blanking period t8, reducing flicker and residual image.

Figure 8:
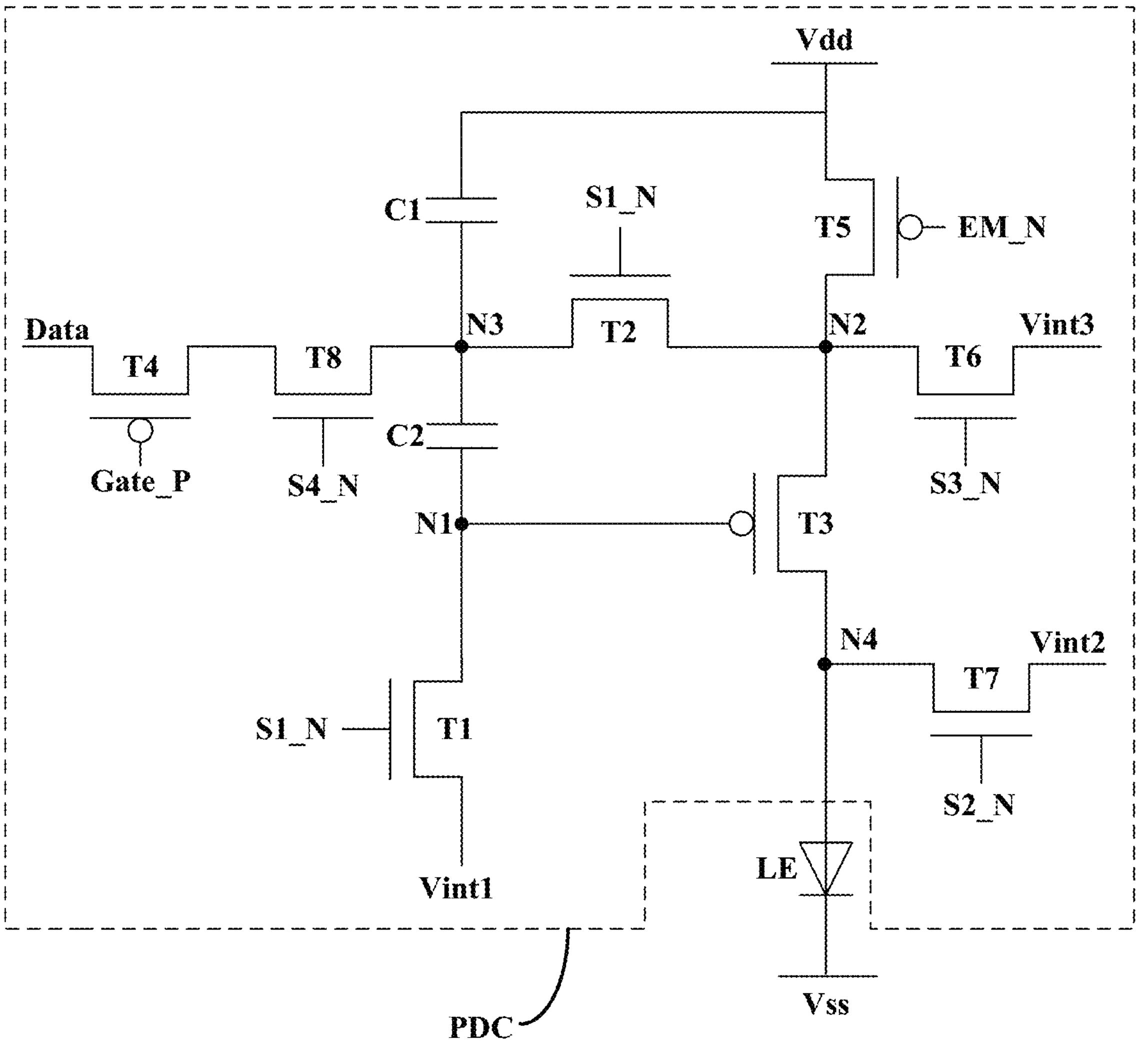
FIG. 8 is a circuit diagram illustrating the structure of a pixel driving circuit in some embodiments according to the present disclosure.

The present disclosure may be implemented in pixel driving circuit having transistors of various types, including a pixel driving circuit having p-type transistors, a pixel driving circuit having n-type transistors, and a pixel driving circuit having one or more p-type transistors and one or more n-type transistors. FIG. 8 is a circuit diagram illustrating the structure of a pixel driving circuit in some embodiments according to the present disclosure. Referring to FIG. 8, the control transistor T8, the compensating transistor T2, the first reset transistor T1, and the second reset transistor T7 are n-type transistors such as metal oxide transistors; and the driving transistor T3, the data write transistor T4, the light emitting control transistor T5, and the third reset transistor T6 are p-type transistors such as polysilicon transistors. For a p-type transistor, an effective control signal (e.g., a turn-on control signal) is a low voltage signal, and an ineffective control signal (e.g., a turn-off control signal) is a high voltage signal. For an n-type transistor, an effective control signal (e.g., a turn-on control signal) is a high voltage signal, and an ineffective control signal (e.g., a turn-off control signal) is a low voltage signal.

Various alternative driving methods may be practiced in the present disclosure. For example, the third control signal line S3_N may share a same scan circuit with one or more control signal lines or gate lines, however, configured to receive an output from the same scan circuit at a different stage. Optionally, the one or more control signal lines or gate lines are configured to receive an output signal of a present stage, and the third control signal line S3_N is configured to receive an output signal of a previous stage. Optionally, the one or more control signal lines or gate lines are configured to receive an output signal of a present stage, and the third control signal line S3_N is configured to receive an output signal of a later stage. Optionally, the one or more control signal lines or gate lines are configured to receive a m-th stage output from the same scan circuit, and the third control signal line S3_N is configured to receive a (m-n)-th stage output from the same scan circuit, m and n being positive integers, m>n. Optionally, the one or more control signal lines or gate lines are configured to receive a m-th stage output from the same scan circuit, and the third control signal line S3_N is configured to receive a (m+n)-th stage output from the same scan circuit, m and n being positive integers, n>m.

In another example, the fourth control signal line S4_N may share a same scan circuit with one or more control signal lines or gate lines, however, configured to receive an output from the same scan circuit at a different stage. Optionally, the one or more control signal lines or gate lines are configured to receive an output signal of a present stage, and the fourth control signal line S4_N is configured to receive an output signal of a previous stage. Optionally, the one or more control signal lines or gate lines are configured to receive an output signal of a present stage, and the fourth control signal line S4_N is configured to receive an output signal of a later stage. Optionally, the one or more control signal lines or gate lines are configured to receive a m-th stage output from the same scan circuit, and the fourth control signal line S4_N is configured to receive a (m−n)-th stage output from the same scan circuit, m and n being positive integers, m>n. Optionally, the one or more control signal lines or gate lines are configured to receive a m-th stage output from the same scan circuit, and the fourth control signal line S4_N is configured to receive a (m+n)-th stage output from the same scan circuit, m and n being positive integers, n>m.

Figure 9:
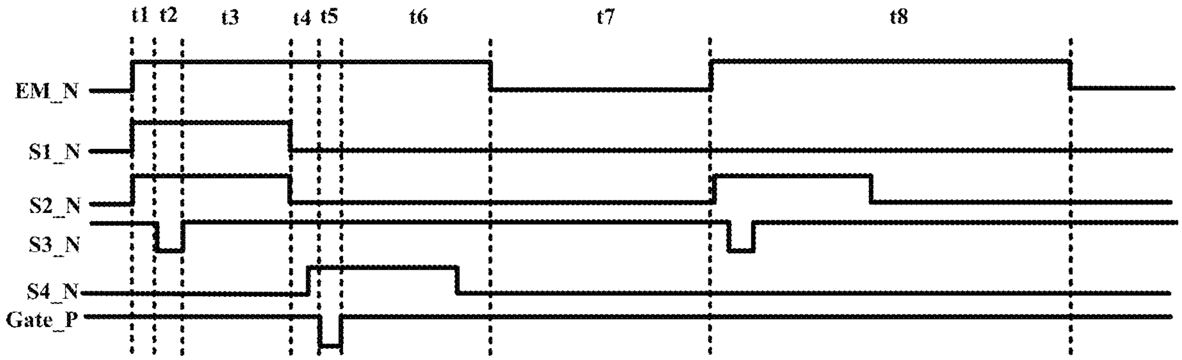
FIG. 9 is a timing diagram illustrating the operation of a pixel driving circuit in some embodiments according to the present disclosure.

FIG. 9 is a timing diagram illustrating the operation of a pixel driving circuit in some embodiments according to the present disclosure. Referring to FIG. 8 and FIG. 9, the third control signal line S3_N and the second gate line Gate_P are configured to receive output signals of different stages, respectively, from a same scan circuit (e.g., a same gate scanning signal generating circuit). Optionally, the second gate line Gate_P is configured to receive an output signal of a present stage, and the third control signal line S3_N is configured to receive an output signal of a previous stage (not necessarily an immediately previous stage).

Referring to FIG. 8 and FIG. 9, the fourth control signal line S4_N and the first control signal line S1_N are configured to receive output signals of different stages, respectively, from a same scan circuit. Optionally, the first control signal line S1_N is configured to receive an output signal of a present stage, and the fourth control signal line S4_N is configured to receive an output signal of a previous stage (not necessarily an immediately previous stage). An effective voltage of the output signal from the same scan circuit is provided to the fourth control signal line S4_N at a time point in the middle of the phase t4, e.g., after the output signal provided to the first control signal line S1_N becomes an ineffective voltage. The second control signal line S2_N and the third control signal line S3_N are configured to receive control signals from independent scan circuits, so that the first electrode and the gate electrode of the driving transistor T3 can be reset during the blanking period t8, reducing flicker and residual image.

In another aspect, the present disclosure provides a display panel having the pixel driving circuit described herein, and one or more scan circuits configured to provide control signals to the pixel driving circuit. Various appropriate scan circuits may be implemented in the present disclosure. In some embodiments, each of the one or more scan circuits includes a plurality of stages of cascaded scan units. Optionally, the plurality of stages of cascaded scan units are configured to provide a plurality of control signals to a plurality of rows of pixel driving circuits.

Figure 10A:
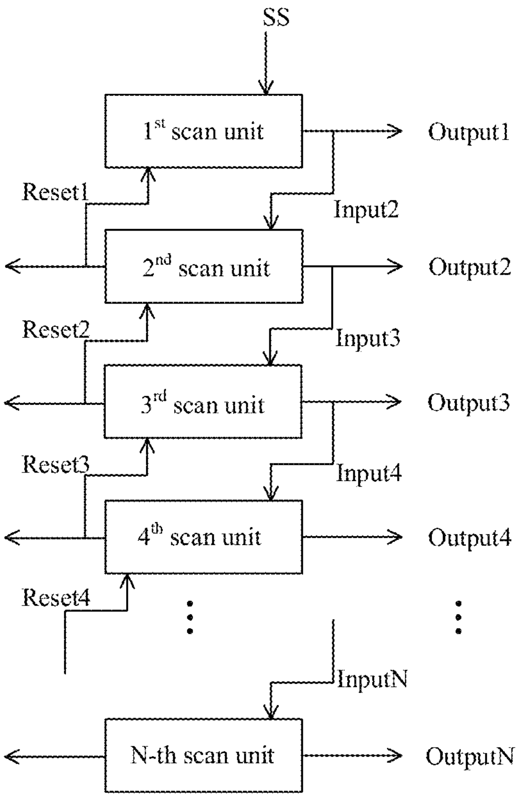
FIG. 10A is a schematic diagram illustrating the structure of a scan circuit in some embodiments according to the present disclosure.

FIG. 10A is a schematic diagram illustrating the structure of a scan circuit in some embodiments according to the present disclosure. Referring to FIG. 10A, the scan circuit in some embodiments includes N number of stages. A respective stage of the N number of stages includes a respective scan unit. As depicted in FIG. 10A, the scan circuit includes a $1^{st}$ scan unit, a $2^{nd}$ scan unit, a $3^{rd}$ scan unit, a $4^{th}$ scan unit, . . . , an N-th scan unit. The N number of scan units are configured to provide N number of control signals (e.g., gate scanning signals, reset control signals, or light emission control signals) to N number of rows of subpixels. The N number of control signals are denoted as Output1, Output2, Output3, Output4, . . . , OutputN in FIG. 10A. An n-th scan unit is configured to receive a start signal SS or an output signal from an output terminal of a previous scan unit (e.g., a (n−1)-th scan unit, a (n−2)-th scan unit, or a (n−3)-th scan unit). As used herein, the term "previous scan unit" is not limited to immediately previous scan unit (e.g., the (n−1)-th scan unit), but includes any appropriate previous scan unit (e.g., the (n−2)-th scan unit, or the (n−3)-th scan unit). In FIG. 10A, the $1^{st}$ scan unit is configured to receive the start signal SS as the input signal, the $2^{nd}$ scan unit is configured to receive an output signal from the $1^{st}$ scan unit as an input signal Input2, the $3^{rd}$ scan unit is configured to receive an output signal from the $2^{nd}$ scan unit as an input signal Input3, the $4^{th}$ scan unit is configured to receive an output signal from the $3^{rd}$ scan unit as an input signal Input4, the N-th scan unit is configured to receive an output signal from the (N−1)-th scan unit as an input signal InputN.

Referring to FIG. 10A, an n-th scan unit is configured to receive an output signal from a subsequent scan unit (e.g., a (n+1)-th scan unit, a (n+2)-th scan unit, or a (n+3)-th scan unit) as a reset signal. As used herein, the term "subsequent scan unit" is not limited to immediately subsequent scan unit (e.g., the (n+1)-th scan unit), but includes any appropriate subsequent scan unit (e.g., the (n+2)-th scan unit, or the (n+3)-th scan unit). In FIG. 10A, the $1^{st}$ scan unit is configured to receive an output signal from the 2nd scan unit as a reset signal Reset1, the $2^{nd}$ scan unit is configured to receive an output signal from the $3^{rd}$ scan unit as a reset signal Reset2, the $3^{rd}$ scan unit is configured to receive an output signal from the $4^{th}$ scan unit as a reset signal Reset3, and the $4^{th}$ scan unit is configured to receive an output signal from the $5^{th}$ scan unit as a reset signal Reset4.

Figure 10B:
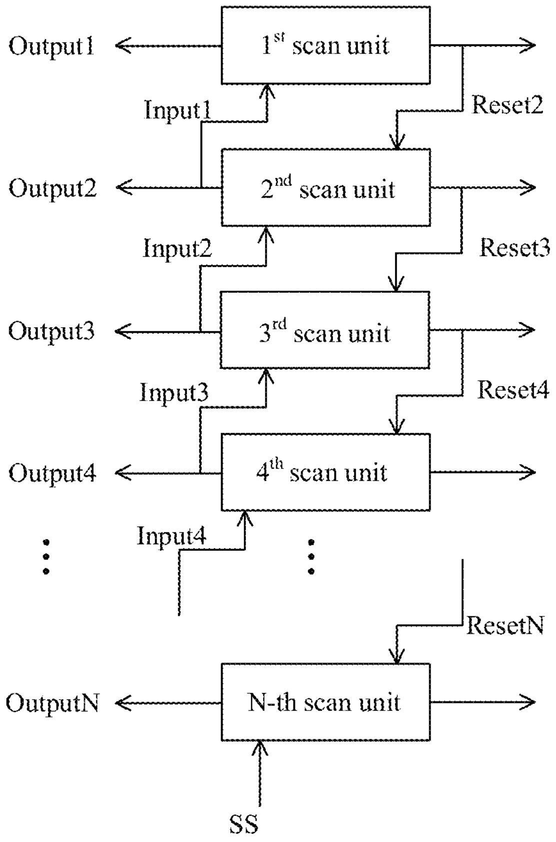
FIG. 10B is a schematic diagram illustrating the structure of a scan circuit in some embodiments according to the present disclosure.

In some embodiments, the scan circuit may be operated in a forward scanning mode and a reverse scanning mode. FIG. 10A illustrates the forward scanning mode of the scan circuit. FIG. 10B is a schematic diagram illustrating the structure of a scan circuit in some embodiments according to the present disclosure. FIG. 10B illustrates the reverse scanning mode of the scan circuit. Referring to FIG. 10B, an n-th scan unit is configured to receive a start signal SS or an output signal from an output terminal of a subsequent scan unit (e.g., a (n+1)-th scan unit, a (n+2)-th scan unit, or a (n+3)-th scan unit). In FIG. 10B, the N-th scan unit is configured to receive the start signal SS as the input signal, the $4^{th}$ scan unit is configured to receive an output signal from a $5^{th}$ scan unit as an input signal Input4, the $3^{rd}$ scan unit is configured to receive an output signal from the $4^{th}$ scan unit as an input signal Input3, the $2^{nd}$ scan unit is configured to receive an output signal from the $3^{rd}$ scan unit as an input signal Input2; and the $1^{st}$ scan unit is configured to receive an output signal from the $2^{nd}$ scan unit as an input signal Input1.

Referring to FIG. 10B, in the reverse scanning mode, an n-th scan unit is configured to receive an output signal from a previous scan unit (e.g., a (n−1)-th scan unit, a (n−2)-th scan unit, or a (n−3)-th scan unit) as a reset signal. In FIG. 10B, the $2^{nd}$ scan unit is configured to receive an output signal from the $1^{st}$ scan unit as a reset signal Reset2, the $3^{rd}$ scan unit is configured to receive an output signal from the $2^{nd}$ scan unit as a reset signal Reset3, the $4^{th}$ scan unit is configured to receive an output signal from the $3^{rd}$ scan unit as a reset signal Reset4, and the $5^{th}$ scan unit is configured to receive an output signal from the $4^{th}$ scan unit as a reset signal Reset5.

Figure 11:
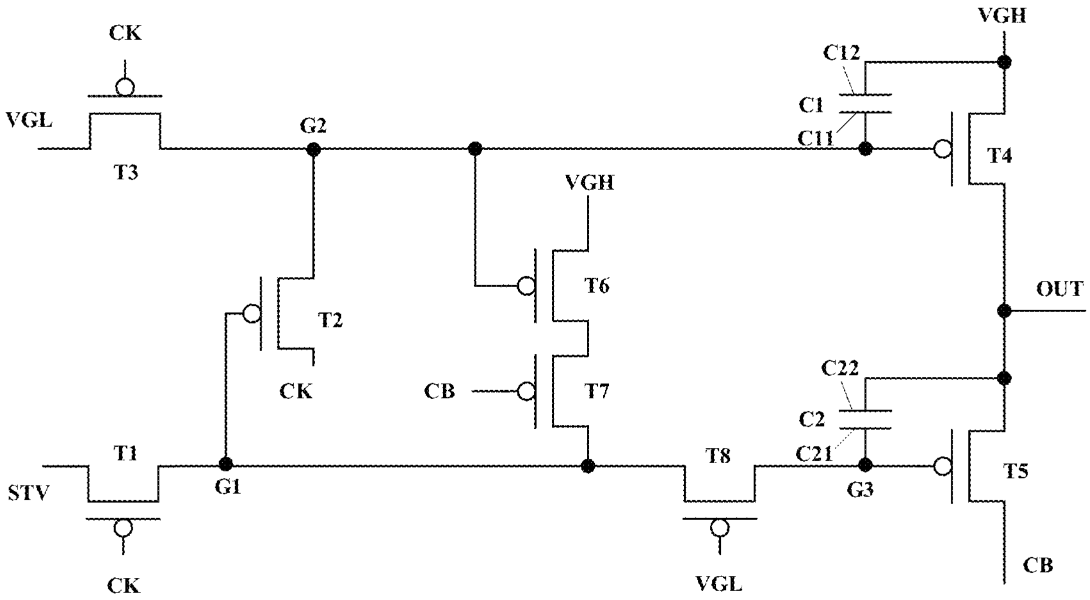
FIG. 11 is a circuit diagram of a scan unit in a scan circuit in some embodiments according to the present disclosure.

FIG. 11 is a circuit diagram of a scan unit in a scan circuit in some embodiments according to the present disclosure. Referring to FIG. 11, the scan unit in some embodiments includes a first control transistor T1 to an eighth control transistor T8, a first control capacitor C1 and a second control capacitor C2. In some embodiments, a gate electrode of the first control transistor T1 is electrically connected to a first clock signal terminal CK, a first electrode of the first control transistor T1 is electrically connected to an input terminal IN, a second electrode of the first control transistor T1 is electrically connected to a first node G1; a gate electrode of the second control transistor T2 is electrically connected to the first node G1, a first electrode of the second control transistor T2 is electrically connected to the first clock signal terminal CK, the second electrode of the second control transistor T2 is electrically connected to a second node G2; a gate electrode of the third control transistor T3 is electrically connected to a first clock signal terminal CK, a first electrode of the third control transistor T3 is electrically connected to a second power supply VGL, a second electrode of the third control transistor T3 is electrically connected to the second node G2; a gate electrode of the fourth control transistor T4 is electrically connected to the second node G2, a first electrode of the fourth control transistor T4 is electrically connected to a first power supply VGH, a second electrode of the fourth control transistor T4 is electrically connected to an output terminal OUT; a gate electrode of the fifth control transistor T5 is electrically connected to a third node G3, a first electrode of the fifth control transistor T5 is electrically connected to a second clock signal terminal CB, a second electrode of the fifth control transistor T5 is electrically connected to the output terminal OUT; a gate electrode of the sixth control transistor T6 is electrically connected to the second node G2, a first electrode of the sixth control transistor T6 is electrically connected to the first power supply VGH, a second electrode of the sixth control transistor T6 is electrically connected to a first electrode of a seventh control transistor T7; a gate electrode of the seventh control transistor T7 is electrically connected to the second clock signal terminal CB, a second electrode of the seventh control transistor T7 is electrically connected to the first node G1; a gate electrode of the eighth control transistor T8 is electrically connected to a second power supply VGL, a first electrode of the eighth control transistor T8 is electrically connected to the first node G1, a second electrode of the eighth control transistor T8 is electrically connected to a third node G3; a first electrode plate C11 of a first control capacitor C1 is electrically connected to the second node G2, a second electrode plate C12 of the first control capacitor C1 is electrically connected to the first power supply VGH; and a first electrode plate C21 of a second control capacitor C2 is electrically connected to the third node G3, and a second electrode plate C22 of the second control capacitor C2 is electrically connected to the output terminal OUT. In one example, the first control transistor T1 to the eighth control transistor T8 may be a p-type transistor or may be an n-type transistor. In another example, the first power supply VGH provides a continuous high level signal and the second power supply VGL provides a continuous low level signal.

In one example, the scan circuit depicted in FIG. 11 may be configured to provide control signals to the second gate line Gate_P in the pixel driving circuits depicted in FIG. 5 and FIG. 8.

Figure 12:
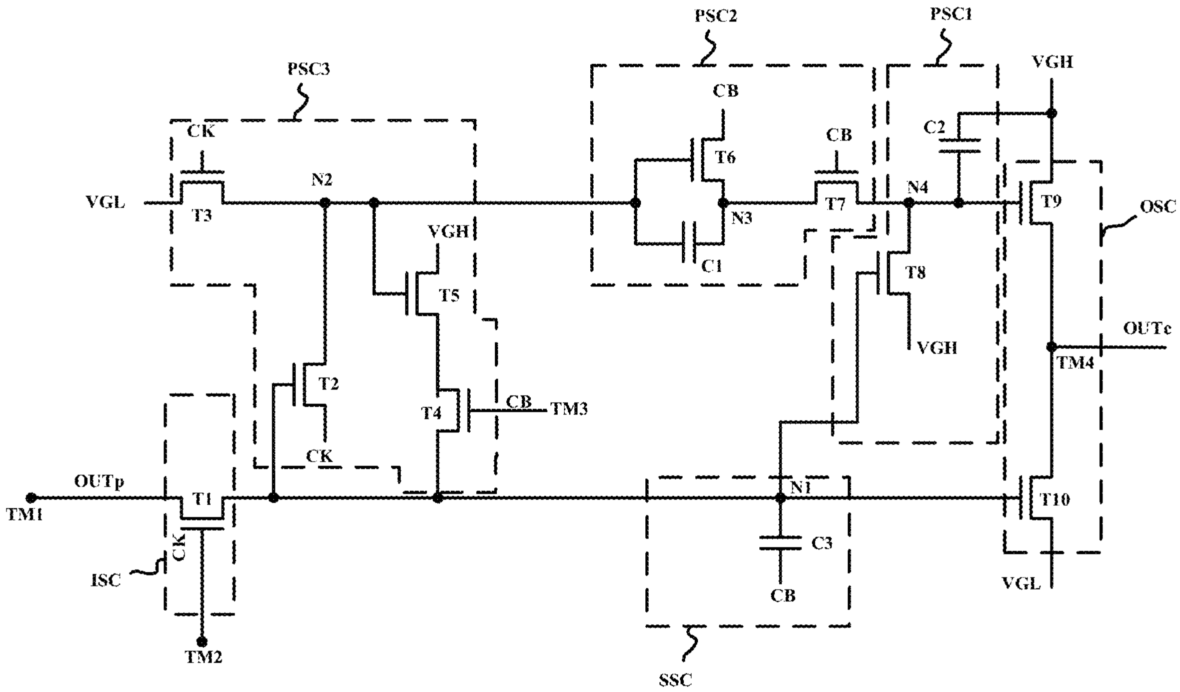
FIG. 12 is a circuit diagram of a scan unit in a scan circuit in some embodiments according to the present disclosure.

FIG. 12 is a circuit diagram of a scan unit in a scan circuit in some embodiments according to the present disclosure. Referring to FIG. 12, the scan unit in some embodiments includes an input subcircuit ISC, an output subcircuit OSC, a first processing subcircuit PSC1, a second processing subcircuit PSC2, a third processing subcircuit PSC3, and a stabilizing subcircuit SSC.

In some embodiments, the output subcircuit OSC is configured to supply the voltage of a first power supply VGH or a second power supply VGL to an output terminal TM4 in response to voltages of a fourth node N4 and a first node N1. Optionally, the output subcircuit OSC includes a ninth transistor T9 and a tenth transistor T10.

The ninth transistor T9 is coupled between a first power supply VGH and the output terminal TM4. A gate electrode of the ninth transistor T9 is coupled to the fourth node N4. The ninth transistor T9 may be turned on or off depending on the voltage of the fourth node N4. Optionally, when the ninth transistor T9 is turned on, the voltage of the first power supply VGH is provided to the output terminal TM4, which (annotated as Outc in FIG. 12) may be transmitted to an n-th gate line and used as a gate driving signal having a gate-on level.

The tenth transistor T10 is coupled between the output terminal TM4 and a second power supply VGL. A gate electrode of the tenth transistor T10 is coupled to the first node N1. The tenth transistor T10 may be turned on or off depending on the voltage of the first node N1. Optionally, when the tenth transistor T10 is turned on, the voltage of the second power supply VGL is provided to the output terminal TM4, which (annotated as Outc in FIG. 12) may be provided to an n-th gate line and used as a gate driving signal having a gate-off level. In one example, when the gate driving signal has a gate-off level, it may be understood that the gate driving signal is not provided.

In some embodiments, the input subcircuit ISC is configured to control the voltages of the first node N1 in response to signals provided to the first input terminal TM1 and the second input terminal TM2, respectively. Optionally, the input subcircuit ISC includes a first transistor T1.

The first transistor T1 is coupled between the first input terminal TM1 and the first node N1. A gate electrode of the first transistor T1 is coupled to the second input terminal TM2. When the first clock signal CK is provided to the second input terminal TM2, the first transistor T1 is turned on to electrically couple the first input terminal TM1 with the first node N1.

In some embodiments, the first processing subcircuit PSC1 is configured to control the voltage of the fourth node N4 in response to the voltage of the first node N1. Optionally, the first processing subcircuit PSC1 includes an eighth transistor T8 and a second capacitor C2.

The eighth transistor T8 is coupled between the first power supply VGH and the fourth node N4. A gate electrode of the eighth transistor T8 is coupled to the first node N1. The eighth transistor T8 may be turned on or off depending on the voltage of the first node N1. Optionally, when the eighth transistor T8 is turned on, the voltage of the first power supply VGH may be provided to the fourth node N4.

The second capacitor C2 is coupled between the first power supply VGH and the fourth node N4. Optionally, the second capacitor C2 is configured to charge a voltage to be applied to the fourth node N4. Optionally, the second capacitor C2 is configured to stably maintain the voltage of the fourth node N4.

In some embodiments, the second processing subcircuit PSC2 is coupled to the second node N2, and is configured to control the voltage of the fourth node N4 in response to a signal input to the third input terminal TM3. Optionally, the second processing subcircuit PSC2 includes a sixth transistor T6, a seventh transistor T7, and a first capacitor C1.

A first terminal of the first capacitor C1 is coupled to the second node N2, and a second terminal of the first capacitor C1 is coupled to a third node N3 that is a common node between the sixth transistor T6 and the seventh transistor T7.

The sixth transistor T6 is coupled between the third node N3 and the second node N2. A gate electrode of the sixth transistor T6 is coupled to the second node N2. The sixth transistor T6 may be turned on depending on the voltage of the second node N2 so that a voltage corresponding to the second clock signal CB provided to the third input terminal TM3 may be applied to the third node N3.

The seventh transistor T7 is coupled between the fourth node N4 and the third node N3. A gate electrode of the seventh transistor T7 is coupled to the third input terminal TM3. The seventh transistor T7 may be turned on in response to the second clock signal CB provided to the third input terminal TM3, and thus, applies the voltage of the first power supply VGH to the third node N3.

In some embodiments, the third processing subcircuit PSC3 is configured to control the voltage of the second node N2. Optionally, the third processing subcircuit PSC3 includes a second transistor T2, a third transistor T3, a fourth transistor T4, and a fifth transistor T5.

The fifth transistor T5 is coupled between the first power supply VGH and the fourth transistor T4. A gate electrode of the fifth transistor T5 is coupled to the second node N2. The fifth transistor T5 may be turned on or off depending on the voltage of the second node N2.

The fourth transistor T4 is coupled between the fifth transistor T5 and the first node N1. A gate electrode of the fourth transistor T4 is configured to be provided with the second clock signal CB provided to the third input terminal TM3.

The second transistor T2 is coupled between the second node N2 and the second input terminal TM2. A gate electrode of the second transistor T2 is coupled to the first node N1.

The third transistor T3 is coupled between the second node N2 and the second power supply VGL. A gate electrode of the third transistor T3 is coupled to the second input terminal TM2. When the first clock signal CK is provided to the second input terminal TM2, the third transistor T3 may be turned on so that the voltage of the second power supply VGL may be provided to the second node N2.

In some embodiments, the stabilizing subcircuit SSC is coupled between the input subcircuit ISC and the output subcircuit OSC. Optionally, the stabilizing subcircuit SSC is configured to limit a voltage drop width of the first node N1. Optionally, the stabilizing subcircuit SSC includes a third capacitor C3.

A first electrode of the third capacitor C3 is coupled to the gate electrode of the tenth transistor T10, and a second electrode of the third capacitor C3 is configured to be provided with the second clock signal CB provided to the third input terminal TM3.

In some embodiments, referring to FIG. 12, each of the first to tenth transistors T1 to T10 may be formed of a p-type transistor. In some embodiments, the gate-on voltage of the first to tenth transistors T1 to T10 may be set to a low level, and the gate-off voltage thereof may be set to a high level.

In alternative embodiments, each of the first to tenth transistors T1 to T10 may be formed of an n-type transistor. In some embodiments, the gate-on voltage of the first to tenth transistors T1 to T10 may be set to a high level, and the gate-off voltage thereof may be set to a low level.

In one example, the scan circuit depicted in FIG. 12 may be configured to provide control signals to at least one of the first control signal line S1_N, the second control signal line S2_N, the third control signal line S3_N, the fourth control signal line S4_N, or the first gate line Gate_N depicted in FIG. 2, FIG. 5, or FIG. 8.

Figure 13:
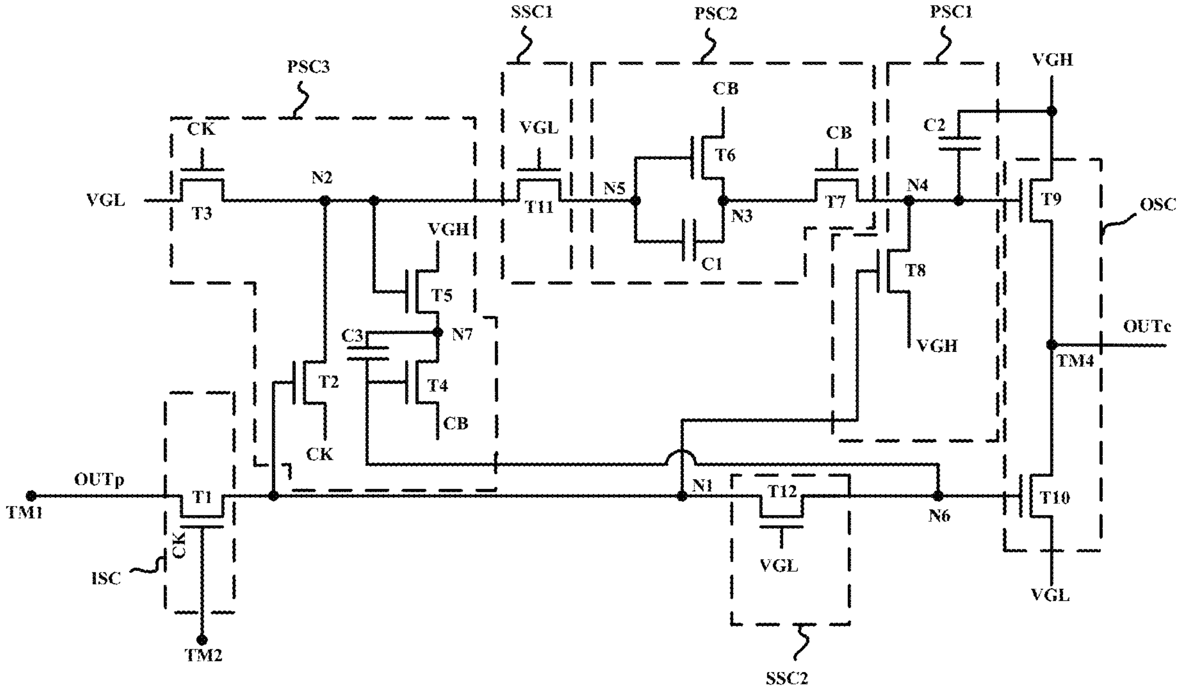
FIG. 13 is a circuit diagram of a scan unit in a scan circuit in some embodiments according to the present disclosure.

FIG. 13 is a circuit diagram of a scan unit in a scan circuit in some embodiments according to the present disclosure. Referring to FIG. 13, the respective scan unit in some embodiments includes an input subcircuit ISC, an output subcircuit OSC, a first processing subcircuit PSC1, a second processing subcircuit PSC2, a third processing subcircuit PSC3, a first stabilizing subcircuit SSC1, and a second stabilizing subcircuit SSC2. A respective scan unit may be configured to transmit control signals to one or more rows of subpixels. In one example, the respective scan unit is configured to transmit control signals to a single row of subpixels. In another example, the respective scan unit is configured to transmit control signals to two or more rows of subpixels.

In some embodiments, the output subcircuit OSC is configured to supply the voltage of a first power supply VGH or a second power supply VGL to an output terminal TM4 in response to voltages of a fourth node N4 and a first node N1. Optionally, the output subcircuit OSC includes a ninth transistor T9 and a tenth transistor T10.

The ninth transistor T9 is coupled between a first power supply VGH and the output terminal TM4. A gate electrode of the ninth transistor T9 is coupled to the fourth node N4. The ninth transistor T9 may be turned on or off depending on the voltage of the fourth node N4. Optionally, when the ninth transistor T9 is turned on, the voltage of the first power supply VGH is provided to the output terminal TM4, which (annotated as Outc in FIG. 13) may be transmitted to an n-th gate line and used as a gate driving signal having a gate-on level.

The tenth transistor T10 is coupled between the output terminal TM4 and a second power supply VGL. A gate electrode of the tenth transistor T10 is coupled to the first node N1. The tenth transistor T10 may be turned on or off depending on the voltage of the first node N1. Optionally, when the tenth transistor T10 is turned on, the voltage of the second power supply VGL is provided to the output terminal TM4, which (annotated as Outc in FIG. 13) may be provided to an n-th gate line and used as a gate driving signal having a gate-off level. In one example, when the gate driving signal has a gate-off level, it may be understood that the gate driving signal is not provided.

In some embodiments, the input subcircuit ISC is configured to control the voltages of the first node N1 in response to signals provided to the first input terminal TM1 and the second input terminal TM2, respectively. Optionally, the input subcircuit ISC includes a first transistor T1.

The first transistor T1 is coupled between the first input terminal TM1 and the first node N1. A gate electrode of the first transistor T1 is coupled to the second input terminal TM2. When the first clock signal CK is provided to the second input terminal TM2, the first transistor T1 is turned on to electrically couple the first input terminal TM1 with the first node N1.

In some embodiments, the first processing subcircuit PSC1 is configured to control the voltage of the fourth node N4 in response to the voltages of the first node N1. Optionally, the first processing subcircuit PSC1 includes an eighth transistor T8 and a second capacitor C2.

The eighth transistor T8 is coupled between the first power supply VGH and the fourth node N4. A gate electrode of the eighth transistor T8 is coupled to the first node N1. The eighth transistor T8 may be turned on or off depending on the voltage of the first node N1. Optionally, when the eighth transistor T8 is turned on, the voltage of the first power supply VGH may be provided to the fourth node N4.

The second capacitor C2 is coupled between the first power supply VGH and the fourth node N4. Optionally, the second capacitor C2 is configured to charge a voltage to be applied to the fourth node N4. Optionally, the second capacitor C2 is configured to stably maintain the voltage of the fourth node N4.

In some embodiments, the second processing subcircuit PSC2 is coupled to a fifth node N5, and is configured to control the voltage of the fourth node N4 in response to a signal input to the third input terminal TM3. Optionally, the second processing subcircuit PSC2 includes a sixth transistor T6, a seventh transistor T7, and a first capacitor C1.

A first terminal of the first capacitor C1 is coupled to the fifth node N5, and a second terminal of the first capacitor C1 is coupled to a third node N3 that is a common node between the sixth transistor T6 and the seventh transistor T7.

The sixth transistor T6 is coupled between the third node N3 and the fifth node N5. A gate electrode of the sixth transistor T6 is coupled to the fifth node N5. The sixth transistor T6 may be turned on depending on the voltage of the fifth node N5 so that a voltage corresponding to the second clock signal CB provided to the third input terminal TM3 may be applied to the third node N3.

The seventh transistor T7 is coupled between the fourth node N4 and the third node N3. A gate electrode of the seventh transistor T7 is coupled to the third input terminal TM3. The seventh transistor T7 may be turned on in response to the second clock signal CB provided to the third input terminal TM3, and thus, applies the voltage of the first power supply VGH to the third node N3.

In some embodiments, the third processing subcircuit PSC3 is configured to control the voltage of the second node N2. Optionally, the third processing subcircuit PSC3 includes a second transistor T2, a third transistor T3, a fourth transistor T4, a fifth transistor T5, and a third capacitor C3.

The fifth transistor T5 is coupled between the first power supply VGH and the fourth transistor T4. A gate electrode of the fifth transistor T5 is coupled to the second node N2. The fifth transistor T5 may be turned on or off depending on the voltage of the second node N2.

The fourth transistor T4 is coupled between the fifth transistor T5 and the third input terminal TM3. A first electrode of the fourth transistor T4 is configured to be provided with the second clock signal CB provided to the third input terminal TM3. A gate electrode of the fourth transistor T4 is coupled to the gate electrode of the tenth transistor T10. A second electrode of the fourth transistor T4 is coupled to the second electrode of the fifth transistor T5.

The second transistor T2 is coupled between the second node N2 and the second input terminal TM2. A gate electrode of the second transistor T2 is coupled to the first node N1.

The third transistor T3 is coupled between the second node N2 and the second power supply VGL. A gate electrode of the third transistor T3 is coupled to the second input terminal TM2. When the first clock signal CK is provided to the second input terminal TM2, the third transistor T3 may be turned on so that the voltage of the second power supply VGL may be provided to the second node N2.

The third capacitor C3 is coupled between the tenth transistor T10 and the fifth transistor T5. A first capacitor electrode of the third capacitor C3 is coupled to the second electrode of the fifth transistor T5 and the first electrode of the fourth transistor T4. A second capacitor electrode of the third capacitor C3 is coupled to the gate electrode of the fourth transistor T4 and the gate electrode of the tenth transistor T10.

In some embodiments, the first stabilizing subcircuit SSC1 is coupled between the second processing subcircuit PSC2 and the third processing subcircuit PSC3. Optionally, the first stabilizing subcircuit SSC1 is configured to limit a voltage drop width of the second node N2. Optionally, the first stabilizing subcircuit SSC1 includes an eleventh transistor T11.

The eleventh transistor T11 is coupled between the second node N2 and the fifth node N5. A gate electrode of the eleventh transistor T11 is coupled to the second power supply VGL. Since the second power supply VGL has a gate-on level voltage, the eleventh transistor T11 may always remain turned on. Therefore, the second node N2 and the fifth node N5 may be maintained at the same voltage, and operated as substantially the same node.

In some embodiments, the second stabilizing subcircuit SSC2 is coupled between the first node N1 and the output subcircuit OSC. Optionally, the second stabilizing subcircuit SSC2 is configured to limit a voltage drop width of the first node N1. Optionally, the second stabilizing subcircuit SSC2 includes a twelfth transistor T12.

The twelfth transistor T12 is coupled between the first node N1 and a gate electrode of the tenth transistor T10. A gate electrode of the twelfth transistor T12 is coupled to the second power supply VGL. Since the second power supply VGL has a gate-on level voltage, the twelfth transistor T12 may always remain turned on. Therefore, the first node N1 and the gate electrode of the tenth transistor T10 may be maintained at the same voltage.

In some embodiments, referring to FIG. 13, each of the first to twelfth transistors T1 to T12 may be formed of a p-type transistor. In some embodiments, the gate-on voltage of the first to twelfth transistors T1 to T12 may be set to a low level, and the gate-off voltage thereof may be set to a high level.

In alternative embodiments, each of the first to twelfth transistors T1 to T12 may be formed of an n-type transistor. In some embodiments, the gate-on voltage of the first to twelfth transistors T1 to T12 may be set to a high level, and the gate-off voltage thereof may be set to a low level.

In one example, the scan circuit depicted in FIG. 13 may be configured to provide control signals to at least one of the first control signal line S1_N, the second control signal line S2_N, the third control signal line S3_N, the fourth control signal line S4_N, or the first gate line Gate_N depicted in FIG. 2, FIG. 5, or FIG. 8.

Figure 14:
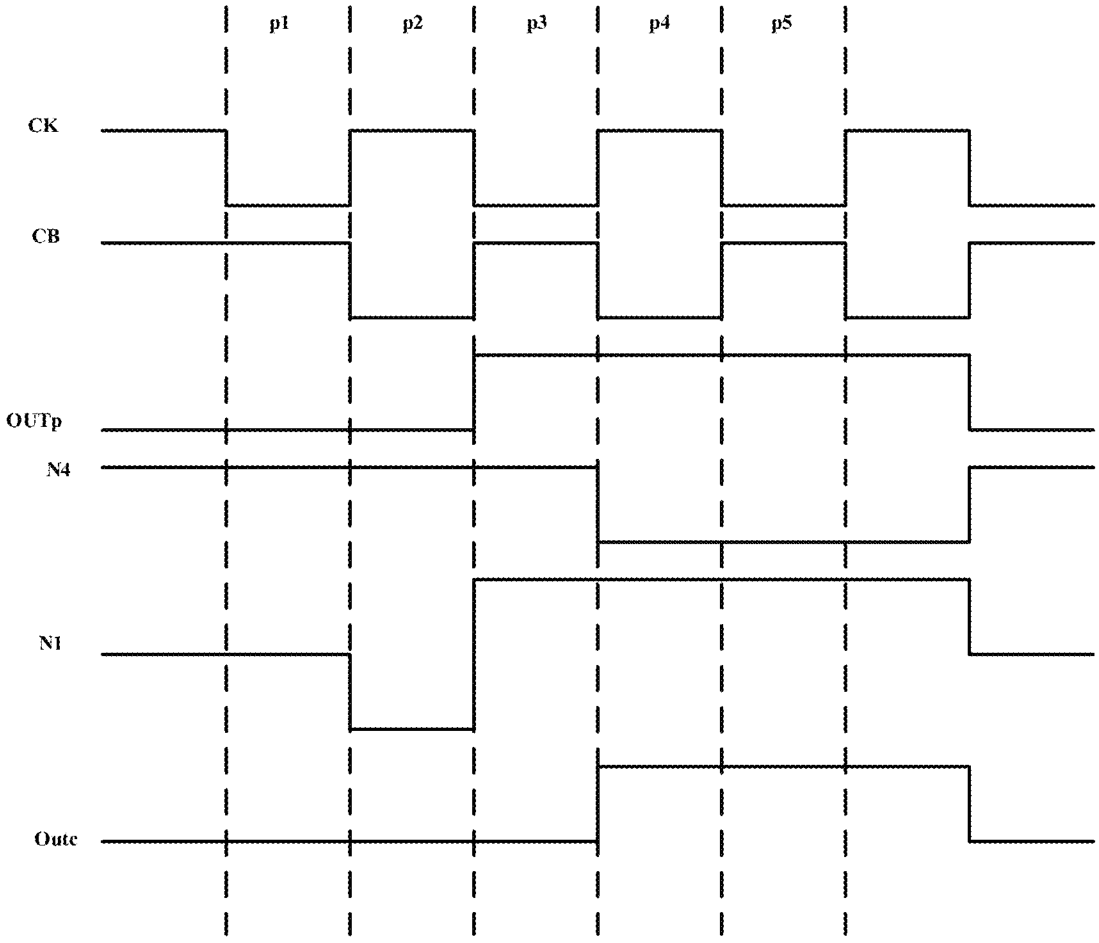
FIG. 14 is a timing diagram illustrating an operation of a stage of a scan unit in some embodiments according to the present disclosure.

FIG. 14 is a timing diagram illustrating an operation of a stage of a scan unit in some embodiments according to the present disclosure. Referring to FIG. 14, the operation of the stage of a scan unit in some embodiments includes a first period p1, a second period p2, a third period p3, a fourth period p4, and a fifth period p5.

In some embodiments, during a first period p1, the first clock signal CK is provided to the second input terminal TM2. The first transistor T1 and the third transistor T3 are turned on. Furthermore, during the first period p1, the second clock signal CB is not provided to the third input terminal TM3, the seventh transistor T7 is turned off.

In some embodiments, when the first transistor T1 is turned on, the first input terminal TM1 and the first node N1 are electrically coupled to each other. The twelfth transistor T12 remains turned on, the first input terminal TM1 is electrically coupled with the sixth node N6 via the first node N1.

In some embodiments, during the first period p1, the start signal STV or the output signal Outp from the output terminal of the previous scan unit to be provided to the first input terminal TM1 has the low level, a low voltage (e.g., the voltage of the second power supply VGL) may be applied to the sixth node N6 and the first node N1. When the sixth node N6 and the first node N1 are set to the low voltage, the second transistor T2, the fourth transistor T4, the eighth transistor T8, and the tenth transistor T10 are turned on.

In some embodiments, when the fourth transistor T4 is turned on, the third input terminal TM3 and the seventh node N7 are electrically coupled to each other. The second clock signal CB is not provided to the third input terminal TM3 during the first period p1, a high voltage may be provided to the seventh node N7. The third capacitor C3 is configured to charge a voltage corresponding to the turned-on state of the fourth transistor T4.

In some embodiments, when the fourth transistor T4 is turned on, the fifth transistor T5 is connected in the form of a diode between the second node N2 and the first power supply VGH. When the fifth transistor T5 is turned on during the first period p1, the voltage of the first power supply VGH is not transmitted to the second node N2, and the voltage of the second node N2 is maintained at the voltage of the preceding state, e.g., the high voltage. The eleventh transistor T11 remains turned on, the high voltage of the second node N2 is applied to the fifth node N5, and the fifth node N5 is set to the high voltage. The fifth transistor T5 and the sixth transistor T6 are turned off.

In some embodiments, when the eighth transistor T8 is turned on, the voltage of the first power supply VGH is provided to the fourth node N4. The ninth transistor T9 is turned off.

In some embodiments, when the tenth transistor T10 is turned on, the voltage of the second power supply VGL is provided to the output terminal TM4. During the first period p1, the gate driving signal is not provided to the n-th stage gate line.

In some embodiments, during a second period p2, the supply of the first clock signal CK to the second input terminal TM2 is interrupted. The first transistor T1 and the third transistor T3 are turned off. The fourth node N4 and the first node N1 maintain the voltages of the preceding period by the second capacitor C2 and the third capacitor C3. Since the fourth node N4 remains in the high voltage state, the ninth transistor T9 remains turned off. Since the first node N1 remains in the low voltage state, the second transistor T2, the fourth transistor T4, the eighth transistor T8, and the tenth transistor T10 remain turned on.

In some embodiments, during the second period p2, the second clock signal CB is provided to the third input terminal TM3. The seventh transistor T7 is turned on by the second clock signal CB provided to the third input terminal TM3. When the seventh transistor T7 is turned on, the fourth node N4 and the third node N3 are electrically coupled to each other. The third node N3 is set to the high voltage.

In some embodiments, during the second period p2, the second clock signal CB is provided to the seventh node N7 via the fourth transistor T4 that is turned on. A low voltage is provided to the seventh node N7. The voltage of the first node N1 is maintained at a voltage (a 2-step low voltage) less than the voltage of the second power supply VGL by coupling of the third capacitor C3.

In some embodiments, during a third period p3, the supply of the second clock signal CB to the third input terminal TM3 is interrupted. When the supply of the second clock signal CB is interrupted, the seventh transistor T7 is turned off.

In some embodiments, during the third period p3, the start signal STV or the output signal Outp from the output terminal of the previous scan unit is provided to the first input terminal TM1, and the first clock signal CK is provided to the second input terminal TM2. When the first clock signal CK is provided to the second input terminal TM2, the first transistor T1 and the third transistor T3 are turned on.

In some embodiments, when the first transistor T1 is turned on, the first input terminal TM1 and the first node N1 are electrically coupled to each other. The twelfth transistor T12 remains turned on, the first input terminal TM1 is electrically coupled with the sixth node N6 via the first node N1. The sixth node N6 and the first node N1 are set to the high voltage by the start signal STV or the output signal Outp from the output terminal of the previous scan unit that is provided to the first input terminal TM1. When the sixth node N6 and the first node N1 are set to the high voltage, the second transistor T2, the fourth transistor T4, the eighth transistor T8, and the tenth transistor T10 are turned off.

In some embodiments, when the third transistor T3 is turned on, the low voltage of the second power supply VGL is applied to the second node N2 so that the second node N2 and the fifth node N5 are set to the low voltage. The fifth transistor T5 and the sixth transistor T6 may be turned on.

In some embodiments, when the fifth transistor T5 is turned on, the voltage of the first power supply VGH is applied to the seventh node N7. The seventh node N7 is maintained at the high voltage. Since the fourth transistor T4 remains turned off, the voltage of the second clock signal CB to be applied to the third input terminal TM3 is not transmitted to the seventh node N7. Since both the seventh node N7 and the sixth node N6 that are the opposite ends of the third capacitor C3 are maintained at the high voltage, the third capacitor C3 is not charged or discharged. A current path is formed from the first power supply VGH to the first node N1 via the fifth transistor T5, and the high voltage of the first power supply VGH is transmitted to the first node N1. The voltage of the first node N1 is stably maintained at the high level.

In some embodiments, when the sixth transistor T6 is turned on, the third input terminal TM3 and the third node N3 are electrically coupled to each other. Since the second clock signal CB is not provided to the third input terminal TM3 during the third period p3, the third node N3 is maintained at the high voltage. Since the seventh transistor T7 remains turned off, the voltage of the third node N3 does not affect the voltage of the fourth node N4. The first capacitor C1 is configured to store a voltage corresponding to the turn-on level of the sixth transistor T6.

In some embodiments, during a fourth period p4, the second clock signal CB may be provided to the third input terminal TM3. When the second clock signal CB is provided to the third input terminal TM3, the seventh transistor T7 is turned on.

In some embodiments, when the seventh transistor T7 is turned on, the fourth node N4 and the third node N3 are electrically coupled to each other. The low voltage of the second clock signal CB that is provided to the third input terminal TM3 via the sixth transistor T6 that remains turned on is provided to the third node N3 and the fourth node N4. When the low voltage is provided to the fourth node N4, the ninth transistor T9 is turned on.

In some embodiments, when the ninth transistor T9 is turned on, the voltage of the first power supply VGH is provided to the output terminal TM4. The voltage of the first power supply VGH that is provided to the output terminal TM4 is provided to the n-th stage gate line as the gate driving signal.

In some embodiments, during a fifth period p5, the supply of the second clock signal CB to the third input terminal TM3 is interrupted. When the supply of the second clock signal CB is interrupted, the seventh transistor T7 is turned off. The fourth node N4 is stably maintained at the high voltage by the second capacitor C2. The ninth transistor T9 remains turned on, and the voltage of the first power supply VGH is provided to the n-th stage gate line as the gate driving signal.

Although the supply of the second clock signal CB is interrupted during the fifth period p5, the fourth transistor T4 remains turned off and, therefore, the voltage of the second clock signal CB is not provided to the seventh node N7 and does not affect the voltage of the first node N1.

In another aspect, the present disclosure provides a display apparatus comprising the pixel driving circuit described herein, and one or more scan circuits configured to provide control signals to the pixel driving circuit. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a micro light emitting diode display apparatus. Optionally, the display apparatus is a mini light emitting diode display apparatus.

In some embodiments, the pixel driving circuit further comprises a compensating transistor having a gate electrode connected to a first control signal line; a first electrode connected to the first capacitor electrode, the fourth capacitor electrode, and the second electrode of the control transistor; and a second electrode connected to a first electrode of the driving transistor. Optionally, the one or more scan circuits comprise a first scan circuit. Optionally, the compensating transistor is an n-type transistor. Optionally, the first control signal line and the fourth control signal line are connected to the first scan circuit, and are configured to receive output signals of different stages, respectively, from the first scan circuit.

In some embodiments, the pixel driving circuit further comprises a first reset transistor having a gate electrode connected to a first control signal line, a first electrode connected to a first reset signal line, and a second electrode connected to the gate electrode of the driving transistor and the third capacitor electrode. Optionally, the one or more scan circuits comprise a first scan circuit. Optionally, the first reset transistor is an n-type transistor. Optionally, the first control signal line and the fourth control signal line are connected to the first scan circuit, and are configured to receive output signals of different stages, respectively, from the first scan circuit.

In some embodiments, the pixel driving circuit further comprises a compensating transistor having a gate electrode connected to a first control signal line; a first electrode connected to the first capacitor electrode, the fourth capacitor electrode, and the second electrode of the control transistor; and a second electrode connected to a first electrode of the driving transistor; and a first reset transistor having a gate electrode connected to a first control signal line, a first electrode connected to the first reset signal line, and a second electrode connected to the gate electrode of the driving transistor and the third capacitor electrode. Optionally, the one or more scan circuits comprise a first scan circuit. Optionally, the compensating transistor and the first reset transistor are an n-type transistor. Optionally, the first control signal line and the fourth control signal line are connected to the first scan circuit, and are configured to receive output signals of different stages, respectively, from the first scan circuit.

In some embodiments, the pixel driving circuit further comprises a third reset transistor having a gate electrode connected to a third control signal line; a first electrode connected to a third reset signal line; and a second electrode connected to the first electrode of the driving transistor, the second electrode of the light emitting control transistor, and the second electrode of the compensating transistor. Optionally, the one or more scan circuits comprise a second scan circuit. Optionally, the third control signal line and the gate line are connected to a same scan circuit, and are configured to receive output signals of different stages, respectively, from the same scan circuit.

In another aspect, the present disclosure provides a method of operating a pixel driving circuit having a driving transistor; a storage capacitor having a first capacitor electrode and a second capacitor electrode; and a coupling capacitor having a third capacitor electrode and a fourth capacitor electrode; a control transistor; and a data write transistor having a gate electrode connected to a gate line, a first electrode connected to a data line, and a second electrode connected to a first electrode of the control transistor, wherein the control transistor has a gate electrode connected to a fourth control signal line, a first electrode connected to the second electrode of the data write transistor, and a second electrode connected to the first capacitor electrode and the fourth capacitor electrode; a gate electrode of the driving transistor is connected to the third capacitor electrode; and the control transistor is an n-type transistor. Optionally, the method comprises, in a data write phase of a frame of image, providing a turning on control signal through the gate line to the gate electrode of the data write transistor; and providing a turning on control signal through the fourth control signal line to the gate electrode of the control transistor.

In some embodiments, the pixel driving circuit further comprises a compensating transistor having a gate electrode connected to a first control signal line; a first electrode connected to the first capacitor electrode, the fourth capacitor electrode, and the second electrode of the control transistor; and a second electrode connected to a first electrode of the driving transistor. Optionally, the compensating transistor is an n-type transistor. Optionally, the method further comprises providing output signals of different stages from a first scan circuit to the first control signal line and the fourth control signal line, respectively.

In some embodiments, the pixel driving circuit further comprises a first reset transistor having a gate electrode connected to a first control signal line, a first electrode connected to a first reset signal line, and a second electrode connected to the gate electrode of the driving transistor and the third capacitor electrode. Optionally, the method further comprises providing output signals of different stages from a first scan circuit to the first control signal line and the fourth control signal line, respectively.

In some embodiments, the pixel driving circuit further comprises a compensating transistor having a gate electrode connected to a first control signal line; a first electrode connected to the first capacitor electrode, the fourth capacitor electrode, and the second electrode of the control transistor; and a second electrode connected to a first electrode of the driving transistor; and a first reset transistor having a gate electrode connected to a first control signal line, a first electrode connected to the first reset signal line, and a second electrode connected to the gate electrode of the driving transistor and the third capacitor electrode. Optionally, the compensating transistor and the first reset transistor are an n-type transistor. Optionally, the method further comprises providing output signals of different stages from a first scan circuit to the first control signal line and the fourth control signal line, respectively.

In some embodiments, the pixel driving circuit further comprises a third reset transistor having a gate electrode connected to a third control signal line; a first electrode connected to a third reset signal line; and a second electrode connected to the first electrode of the driving transistor, the second electrode of the light emitting control transistor, and the second electrode of the compensating transistor. Optionally, the method further comprises providing output signals of different stages from a second scan circuit to the third control signal line and the gate line, respectively.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A pixel driving circuit, comprising:

a driving transistor;

a storage capacitor having a first capacitor electrode and a second capacitor electrode;

a coupling capacitor having a third capacitor electrode and a fourth capacitor electrode;

a control transistor;

a data write transistor having a gate electrode connected to a gate line, a first electrode connected to a data line, and a second electrode connected a first electrode of the control transistor; and a compensating transistor having a gate electrode connected to a first control signal line; a first electrode connected to the first capacitor electrode, the fourth capacitor electrode, and the second electrode of the control transistor; and a second electrode connected to a first electrode of the driving transistor;

wherein the control transistor has a gate electrode connected to a fourth control signal line, a first electrode connected to the second electrode of the data write transistor, and a second electrode connected to the first capacitor electrode and the fourth capacitor electrode;

a gate electrode of the driving transistor is connected to the third capacitor electrode; and the control transistor is an n-type transistor;

wherein the compensating transistor is an n-type transistor; and the first control signal line and the fourth control signal line are connected to a same scan circuit, and are configured to receive output signals of different stages, respectively, from the same scan circuit.

2. The pixel driving circuit of claim 1, wherein the data write transistor is a p-type transistor.

3. The pixel driving circuit of claim 1, further comprising a first reset transistor having a gate electrode connected to a first control signal line, a first electrode connected to a first reset signal line, and a second electrode connected to the gate electrode of the driving transistor and the third capacitor electrode.

4. The pixel driving circuit of claim 3, wherein the first reset transistor is an n-type transistor; and the first control signal line and the fourth control signal line are connected to a same scan circuit, and are configured to receive output signals of different stages, respectively, from the same scan circuit.

5. The pixel driving circuit of claim 1, further comprising:

a compensating transistor having a gate electrode connected to a first control signal line; a first electrode connected to the first capacitor electrode, the fourth capacitor electrode, and the second electrode of the control transistor; and a second electrode connected to a first electrode of the driving transistor; and a first reset transistor having a gate electrode connected to a first control signal line, a first electrode connected to the first reset signal line, and a second electrode connected to the gate electrode of the driving transistor and the third capacitor electrode;

wherein the compensating transistor and the first reset transistor are an n-type transistor; and the first control signal line and the fourth control signal line are connected to a same scan circuit, and are configured to receive output signals of different stages, respectively, from the same scan circuit.

6. The pixel driving circuit of claim 1, further comprising a third reset transistor having a gate electrode connected to a third control signal line; a first electrode connected to a third reset signal line; and a second electrode connected to the first electrode of the driving transistor, the second electrode of the light emitting control transistor, and the second electrode of the compensating transistor.

7. The pixel driving circuit of claim 6, wherein the third control signal line and the gate line are connected to a same scan circuit, and are configured to receive output signals of different stages, respectively, from the same scan circuit.

8. The pixel driving circuit of claim 7, wherein the third reset transistor and the data write transistor are p-type transistors.

9. A display apparatus, comprising a pixel driving circuit, and one or more scan circuits configured to provide control signals to the pixel driving circuit;

wherein the pixel driving circuit comprises:

a driving transistor;

a storage capacitor having a first capacitor electrode and a second capacitor electrode;

a coupling capacitor having a third capacitor electrode and a fourth capacitor electrode;

a control transistor; and a data write transistor having a gate electrode connected to a gate line, a first electrode connected to a data line, and a second electrode connected a first electrode of the control transistor;

wherein the control transistor has a gate electrode connected to a fourth control signal line, a first electrode connected to the second electrode of the data write transistor, and a second electrode connected to the first capacitor electrode and the fourth capacitor electrode;

a gate electrode of the driving transistor is connected to the third capacitor electrode; and the control transistor is an n-type transistor;

wherein the pixel driving circuit further comprises a compensating transistor having a gate electrode connected to a first control signal line; a first electrode connected to the first capacitor electrode, the fourth capacitor electrode, and the second electrode of the control transistor; and a second electrode connected to a first electrode of the driving transistor;

the one or more scan circuits comprise a first scan circuit;

the compensating transistor is an n-type transistor; and the first control signal line and the fourth control signal line are connected to the first scan circuit, and are configured to receive output signals of different stages, respectively, from the first scan circuit.

10. The display apparatus of claim 9, wherein the pixel driving circuit further comprises a first reset transistor having a gate electrode connected to a first control signal line, a first electrode connected to a first reset signal line, and a second electrode connected to the gate electrode of the driving transistor and the third capacitor electrode;

the one or more scan circuits comprise a first scan circuit;

the first reset transistor is an n-type transistor; and the first control signal line and the fourth control signal line are connected to the first scan circuit, and are configured to receive output signals of different stages, respectively, from the first scan circuit.

11. The display apparatus of claim 9, wherein the pixel driving circuit further comprises:

a compensating transistor having a gate electrode connected to a first control signal line; a first electrode connected to the first capacitor electrode, the fourth capacitor electrode, and the second electrode of the control transistor; and a second electrode connected to a first electrode of the driving transistor; and a first reset transistor having a gate electrode connected to a first control signal line, a first electrode connected to the first reset signal line, and a second electrode connected to the gate electrode of the driving transistor and the third capacitor electrode;

the one or more scan circuits comprise a first scan circuit;

the compensating transistor and the first reset transistor are an n-type transistor; and the first control signal line and the fourth control signal line are connected to the first scan circuit, and are configured to receive output signals of different stages, respectively, from the first scan circuit.

12. The display apparatus of claim 9, wherein the pixel driving circuit further comprises a third reset transistor having a gate electrode connected to a third control signal line; a first electrode connected to a third reset signal line; and a second electrode connected to the first electrode of the driving transistor, the second electrode of the light emitting control transistor, and the second electrode of the compensating transistor;

the one or more scan circuits comprise a second scan circuit; and the third control signal line and the gate line are connected to a same scan circuit, and are configured to receive output signals of different stages, respectively, from the same scan circuit.

13. A method of operating a pixel driving circuit having a driving transistor; a storage capacitor having a first capacitor electrode and a second capacitor electrode; a coupling capacitor having a third capacitor electrode and a fourth capacitor electrode; a control transistor; and a data write transistor having a gate electrode connected to a gate line, a first electrode connected to a data line, and a second electrode connected a first electrode of the control transistor, wherein the control transistor has a gate electrode connected to a fourth control signal line, a first electrode connected to the second electrode of the data write transistor, and a second electrode connected to the first capacitor electrode and the fourth capacitor electrode; a gate electrode of the driving transistor is connected to the third capacitor electrode; and the control transistor is an n-type transistor;

wherein the method comprises, in a data write phase of a frame of image, providing a turning on control signal through the gate line to the gate electrode of the data write transistor; and providing a turning on control signal through the fourth control signal line to the gate electrode of the control transistor;

wherein the pixel driving circuit further comprises a compensating transistor having a gate electrode connected to a first control signal line; a first electrode connected to the first capacitor electrode, the fourth capacitor electrode, and the second electrode of the control transistor; and a second electrode connected to a first electrode of the driving transistor;

the compensating transistor is an n-type transistor; and the method further comprises providing output signals of different stages from a first scan circuit to the first control signal line and the fourth control signal line, respectively.

14. The method of claim 13, wherein the pixel driving circuit further comprises a first reset transistor having a gate electrode connected to a first control signal line, a first electrode connected to a first reset signal line, and a second electrode connected to the gate electrode of the driving transistor and the third capacitor electrode; and the method further comprises providing output signals of different stages from a first scan circuit to the first control signal line and the fourth control signal line, respectively.

15. The method of claim 13, wherein the pixel driving circuit further comprises:

a compensating transistor having a gate electrode connected to a first control signal line; a first electrode connected to the first capacitor electrode, the fourth capacitor electrode, and the second electrode of the control transistor; and a second electrode connected to a first electrode of the driving transistor; and a first reset transistor having a gate electrode connected to a first control signal line, a first electrode connected to the first reset signal line, and a second electrode connected to the gate electrode of the driving transistor and the third capacitor electrode;

wherein the compensating transistor and the first reset transistor are an n-type transistor; and the method further comprises providing output signals of different stages from a first scan circuit to the first control signal line and the fourth control signal line, respectively.

16. The method of claim 13, wherein the pixel driving circuit further comprises a third reset transistor having a gate electrode connected to a third control signal line; a first electrode connected to a third reset signal line; and a second electrode connected to the first electrode of the driving transistor, the second electrode of the light emitting control transistor, and the second electrode of the compensating transistor; and the method further comprises providing output signals of different stages from a second scan circuit to the third control signal line and the gate line, respectively.

* * * * *